United States Patent
Kalouche

(10) Patent No.: US 11,794,332 B2
(45) Date of Patent: Oct. 24, 2023

(54) STORAGE SYSTEMS AND METHODS FOR ROBOTIC PICKING

(71) Applicant: Nimble Robotics, Inc., San Francisco, CA (US)

(72) Inventor: Simon Kalouche, San Francisco, CA (US)

(73) Assignee: Nimble Robotics, Inc., San Francisco, CA (US)

(*) Notice: Subject to any disclaimer, the term of this patent is extended or adjusted under 35 U.S.C. 154(b) by 696 days.

(21) Appl. No.: 16/856,409

(22) Filed: Apr. 23, 2020

(65) Prior Publication Data
US 2021/0032033 A1   Feb. 4, 2021

Related U.S. Application Data

(63) Continuation of application No. 16/831,963, filed on Mar. 27, 2020, which is a continuation of application No. 16/804,251, filed on Feb. 28, 2020.
(Continued)

(51) Int. Cl.
*B65G 1/06* (2006.01)
*B65G 1/137* (2006.01)
(Continued)

(52) U.S. Cl.
CPC ............... *B25J 5/007* (2013.01); *B25J 5/02* (2013.01); *B25J 9/042* (2013.01); *B25J 9/14* (2013.01);
(Continued)

(58) Field of Classification Search
CPC .. B65G 1/1373; B65G 1/0464; B65G 1/0478; B65G 1/065; B65G 1/1375;
(Continued)

(56) References Cited

U.S. PATENT DOCUMENTS 4,660,405 A   4/1987   Widegren et al.
4,809,747 A   3/1989   Choly et al.
(Continued)

FOREIGN PATENT DOCUMENTS

CN   103122771 B    1/2015
DE   102010002317 A1   8/2011
(Continued)

OTHER PUBLICATIONS

Partial International Search Report including Provisional Opinion for Application No. PCT/US2020/043873, dated Nov. 2, 2020, pp. 1-37.
(Continued)

*Primary Examiner* — Thomas Randazzo
(74) *Attorney, Agent, or Firm* — Lerner David LLP

(57) ABSTRACT

A storage system configured to house a plurality of containers housing inventory items includes support members, a first set of parallel rails to support a mobile, manipulator robot, and a fluid supply line having a plurality of valves disposed within the fluid supply line. Each of the valves having a closed condition in which the supply line is in fluid isolation from an outside environment and an open condition in which the supply line is in fluid communication with the environment such that the supply line is configured to supply fluid to a mobile, manipulator robot. Mobile, manipulator robots for retrieving inventory items stored within the containers and retrieval methods are also disclosed herein.

20 Claims, 20 Drawing Sheets

Related U.S. Application Data

(60) Provisional application No. 62/961,390, filed on Jan. 15, 2020, provisional application No. 62/879,843, filed on Jul. 29, 2019.

(51) Int. Cl.
| | |
|---|---|
| *B66F 9/06* | (2006.01) |
| *G05B 19/418* | (2006.01) |
| *G05D 1/02* | (2020.01) |
| *G06V 20/64* | (2022.01) |
| *B25J 5/00* | (2006.01) |
| *B25J 9/14* | (2006.01) |
| *B25J 9/16* | (2006.01) |
| *B25J 13/08* | (2006.01) |
| *B25J 19/04* | (2006.01) |
| *B25J 15/06* | (2006.01) |
| *B25J 15/04* | (2006.01) |
| *B25J 15/02* | (2006.01) |
| *B25J 5/02* | (2006.01) |
| *B25J 19/00* | (2006.01) |
| *B65G 47/91* | (2006.01) |
| *B25J 13/00* | (2006.01) |
| *B25J 15/00* | (2006.01) |
| *B25J 19/02* | (2006.01) |
| *B65G 1/04* | (2006.01) |
| *B25J 9/04* | (2006.01) |
| *B25J 17/02* | (2006.01) |
| *B60M 1/30* | (2006.01) |

(52) U.S. Cl.
CPC .............. *B25J 9/161* (2013.01); *B25J 9/162* (2013.01); *B25J 9/163* (2013.01); *B25J 9/1612* (2013.01); *B25J 9/1689* (2013.01); *B25J 9/1697* (2013.01); *B25J 13/00* (2013.01); *B25J 13/006* (2013.01); *B25J 13/08* (2013.01); *B25J 13/089* (2013.01); *B25J 15/0061* (2013.01); *B25J 15/02* (2013.01); *B25J 15/0441* (2013.01); *B25J 15/0616* (2013.01); *B25J 15/0625* (2013.01); *B25J 17/02* (2013.01); *B25J 19/005* (2013.01); *B25J 19/0025* (2013.01); *B25J 19/02* (2013.01); *B25J 19/021* (2013.01); *B25J 19/04* (2013.01); *B60M 1/30* (2013.01); *B65G 1/0464* (2013.01); *B65G 1/0478* (2013.01); *B65G 1/065* (2013.01); *B65G 1/1373* (2013.01); *B65G 1/1375* (2013.01); *B65G 47/917* (2013.01); *B65G 47/918* (2013.01); *B65G 2203/041* (2013.01); *B65G 2203/042* (2013.01); *B65G 2209/04* (2013.01)

(58) Field of Classification Search
CPC ............... B65G 47/917; B65G 47/918; B65G 2203/041; B65G 2203/042; B65G 2209/04; B25J 5/007; B25J 5/02; B25J 9/042; B25J 9/14; B25J 9/161; B25J 9/1612; B25J 9/162; B25J 9/163; B25J 9/1689; B25J 9/1697; B25J 13/00; B25J 13/006; B25J 13/08; B25J 13/089; B25J 15/0061; B25J 15/02; B25J 15/0441; B25J 15/0616; B25J 15/0625; B25J 17/02; B25J 19/0025; B25J 19/005; B25J 19/02; B25J 19/021; B25J 19/04; B25J 9/044; B60M 1/30; G06Q 10/087; G05B 2219/40252; G05B 2219/40272; G05B 2219/45063

See application file for complete search history.

(56) References Cited

U.S. PATENT DOCUMENTS

| | | |
|---|---|---|
| 4,836,111 A | 6/1989 | Kaufmann |
| 5,993,365 A | 11/1999 | Stagnitto et al. |
| 6,270,017 B1 | 8/2001 | Vennell |
| 6,654,662 B1 | 11/2003 | Hognaland |
| 7,181,314 B2 | 2/2007 | Zhang et al. |
| 8,240,726 B2 | 8/2012 | Subotincic |
| 8,434,414 B2 | 5/2013 | Wessel et al. |
| 8,718,814 B1 | 5/2014 | Clark et al. |
| 9,465,386 B2 | 10/2016 | Huang et al. |
| 9,486,926 B2 | 11/2016 | Kawano |
| 9,540,171 B2 | 1/2017 | Elazary et al. |
| 9,550,624 B2 | 1/2017 | Khodl et al. |
| 9,623,569 B2 | 4/2017 | McCollum et al. |
| 9,650,215 B2 | 5/2017 | Girtman |
| 9,669,543 B1* | 6/2017 | Stubbs .................. B25J 9/1612 |
| 9,682,822 B2 | 6/2017 | Lindbo et al. |
| 9,688,472 B1 | 6/2017 | Stubbs et al. |
| 9,785,911 B2 | 10/2017 | Galluzzo et al. |
| 9,802,317 B1* | 10/2017 | Watts ................... G05B 19/402 |
| 9,815,625 B2 | 11/2017 | DeWitt et al. |
| 9,940,604 B2 | 4/2018 | Galluzzo et al. |
| 9,975,256 B1* | 5/2018 | Swiercz .................. B25J 9/142 |
| 9,987,748 B2 | 6/2018 | Stubbs et al. |
| 10,000,337 B2 | 6/2018 | Lindbo et al. |
| 10,086,519 B2 | 10/2018 | Wagner et al. |
| 10,112,771 B2 | 10/2018 | D'Andrea et al. |
| 10,147,069 B2 | 12/2018 | Galluzzo et al. |
| 10,189,641 B2 | 1/2019 | Hognaland |
| 10,272,566 B2 | 4/2019 | Wellman et al. |
| 10,315,315 B2 | 6/2019 | Wagner et al. |
| 10,322,506 B2 | 6/2019 | Ding et al. |
| 10,350,755 B2 | 7/2019 | Wagner et al. |
| 10,360,531 B1* | 7/2019 | Stallman .............. G06Q 10/087 |
| 10,435,241 B2 | 10/2019 | Lert et al. |
| 10,438,034 B2 | 10/2019 | Wagner et al. |
| 10,500,735 B1 | 12/2019 | Menon et al. |
| 10,549,928 B1 | 2/2020 | Chavez et al. |
| 10,576,507 B2 | 3/2020 | Jain et al. |
| 10,583,560 B1* | 3/2020 | Rodrigues .............. B65G 1/137 |
| 10,611,037 B1 | 4/2020 | Polido et al. |
| 10,759,597 B2* | 9/2020 | Lindbo ................. B65G 1/065 |
| 11,220,400 B2 | 1/2022 | Lisso |
| 11,407,118 B1 | 8/2022 | Augenbraun |
| 11,534,923 B1 | 12/2022 | De Arruda Camargo Polido |
| 2006/0112034 A1* | 5/2006 | Okamoto ............... B25J 9/1697 |
| | | 706/16 |
| 2008/0003092 A1 | 1/2008 | Baclija |
| 2008/0181759 A1 | 7/2008 | Gaegauf |
| 2008/0229861 A1 | 9/2008 | Inoue |
| 2013/0076891 A1 | 3/2013 | Childress |
| 2013/0110280 A1 | 5/2013 | Folk |
| 2014/0014470 A1 | 1/2014 | Razumov |
| 2015/0098775 A1 | 4/2015 | Razumov |
| 2015/0230369 A1 | 8/2015 | Danek et al. |
| 2016/0167228 A1* | 6/2016 | Wellman ................ B25J 9/1602 |
| | | 901/3 |
| 2016/0272421 A1 | 9/2016 | Hognaland |
| 2016/0297610 A1 | 10/2016 | Grosse |
| 2016/0347545 A1 | 12/2016 | Lindbo et al. |
| 2016/0361821 A1 | 12/2016 | Lessing et al. |
| 2017/0067488 A1 | 3/2017 | Cho |
| 2017/0080579 A1 | 3/2017 | Wagner et al. |
| 2017/0136632 A1* | 5/2017 | Wagner .................. B25J 9/0093 |
| 2017/0157649 A1 | 6/2017 | Wagner et al. |
| 2017/0197316 A1 | 7/2017 | Wagner et al. |
| 2017/0313514 A1 | 11/2017 | Lert, Jr. et al. |
| 2018/0029797 A1 | 2/2018 | Hance et al. |
| 2018/0057263 A1 | 3/2018 | Beer |
| 2018/0127219 A1 | 5/2018 | Wagner et al. |
| 2018/0133968 A1 | 5/2018 | Zeulner |
| 2018/0148259 A1 | 5/2018 | Gravelle et al. |
| 2018/0251300 A1 | 9/2018 | Kapuria et al. |
| 2018/0265291 A1 | 9/2018 | Wagner et al. |
| 2018/0265311 A1 | 9/2018 | Wagner et al. |
| 2018/0284760 A1* | 10/2018 | Gupta .................... B25J 13/065 |

(56) References Cited

U.S. PATENT DOCUMENTS

| | | |
|---|---|---|
| 2018/0319590 A1 | 11/2018 | Lindbo et al. |
| 2018/0346243 A1 | 12/2018 | Lindbo et al. |
| 2018/0354723 A1 | 12/2018 | Peebles et al. |
| 2019/0009414 A1* | 1/2019 | Lipay ............... B25J 15/0009 |
| 2019/0026687 A1 | 1/2019 | Voloskov |
| 2019/0084152 A1 | 3/2019 | Deacon |
| 2019/0135555 A1 | 5/2019 | Wagner et al. |
| 2019/0176348 A1 | 6/2019 | Bingham et al. |
| 2019/0217477 A1* | 7/2019 | Paepcke ............... G06Q 30/06 |
| 2019/0245366 A1 | 8/2019 | Coady et al. |
| 2019/0291277 A1 | 9/2019 | Oleynik |
| 2019/0291282 A1 | 9/2019 | Marchese et al. |
| 2019/0291955 A1 | 9/2019 | Bastian, II |
| 2019/0337733 A1 | 11/2019 | Wehner et al. |
| 2019/0339693 A1 | 11/2019 | Menon et al. |
| 2019/0361672 A1* | 11/2019 | Odhner ............... G06F 7/00 |
| 2019/0389082 A1* | 12/2019 | Higo ............... B25J 15/0616 |
| 2020/0017314 A1 | 1/2020 | Rose et al. |
| 2020/0017317 A1 | 1/2020 | Yap et al. |
| 2020/0030994 A1 | 1/2020 | Wagner |
| 2020/0031575 A1 | 1/2020 | Hognaland |
| 2020/0094997 A1 | 3/2020 | Menon et al. |
| 2020/0164517 A1* | 5/2020 | Dick ............... B25J 9/1697 |
| 2020/0189122 A1 | 6/2020 | Polido et al. |
| 2020/0290804 A1 | 9/2020 | Fjeldheim et al. |
| 2020/0354147 A1 | 11/2020 | Lindbo |
| 2020/0363259 A1* | 11/2020 | Bergstra ............... G01G 23/40 |
| 2020/0407165 A1 | 12/2020 | Roth et al. |
| 2021/0031364 A1* | 2/2021 | Groz ............... B25J 9/1689 |
| 2021/0101744 A1 | 4/2021 | Hognaland |
| 2021/0122054 A1 | 4/2021 | Sun et al. |
| 2021/0163223 A1 | 6/2021 | Lindbo et al. |
| 2021/0171282 A1 | 6/2021 | Solovianenko |
| 2022/0002076 A1 | 1/2022 | Austrheim |
| 2022/0002077 A1 | 1/2022 | Austrheim et al. |
| 2022/0073279 A1 | 3/2022 | Austrheim et al. |
| 2022/0193925 A1 | 6/2022 | Honarpardaz |

FOREIGN PATENT DOCUMENTS

| | | |
|---|---|---|
| EP | 2708335 A1 | 3/2014 |
| JP | 2017132002 A | 8/2017 |
| KR | 20170052784 A | 5/2017 |
| NO | 317366 B1 | 10/2004 |
| WO | 2012083333 A2 | 6/2012 |
| WO | 2014040843 A1 | 3/2014 |
| WO | 2015019055 A1 | 2/2015 |
| WO | 2016063197 A1 | 4/2016 |
| WO | 2018146687 A1 | 8/2018 |
| WO | 2018234155 A1 | 12/2018 |
| WO | 2019084457 A9 | 9/2019 |
| WO | 2020018468 A1 | 1/2020 |
| WO | 2020023861 A1 | 1/2020 |

OTHER PUBLICATIONS

International Search Report and Written Opinion in Appln. No. PCT/US2022/042896 dated Dec. 9, 2022 (19 pages).

Petri Honkamaa et al : "A lightweight approach for augmented reality on camera phones using 2D images to simulate 3D", Proceedings of the 6th I nternational Conference on Mobile and Ubiquitous Multimedia, Mum 2007, Oulu , Finland, Dec. 12-14, 2007, ACM, New York, NY, USA, Dec. 12, 2007 (Dec. 12, 2007) , pp. 155-159, XP058334620, DOI : 10 . 1145/1329469.1329490 ISBN : 978-1-59593~9 1 6-6, abstract figure 1 section 3.

* cited by examiner

STORAGE SYSTEMS AND METHODS FOR ROBOTIC PICKING

CROSS-REFERENCE TO RELATED APPLICATIONS

This application is a continuation of U.S. application Ser. No. 16/831,963, filed Mar. 27, 2020, which is a continuation of U.S. application Ser. No. 16/804,251, filed Feb. 28, 2020, which claims the benefit of the filing date of U.S. Provisional Patent Application No. 62/961,390, filed Jan. 15, 2020 and the benefit of the filing date of U.S. Provisional Patent Application No. 62/879,843, filed Jul. 29, 2019, the disclosures of which are each hereby incorporated herein by reference.

BACKGROUND OF THE DISCLOSURE

The present disclosure generally relates to storage systems and inventory retrieval methods, and more particularly, to a storage system and a mobile, manipulator robot for retrieving inventory items from the storage system.

Warehouses, or distribution fulfillment centers, require systems that enable the efficient storage and retrieval of a large number of diverse products. Traditionally, inventory items are stored in containers and arranged on rows of shelving on either side of an aisle. Each container, or bin, holds a plurality of items of one or more product types. The aisles provide access between the shelving for an operator or robot to migrate the aisles and retrieve the items. It is well understood that the aisles reduce the storage density of the system. In other words, the amount of space actually used for the storage of products (e.g., the shelving) is relatively small compared to the amount of space required for the storage system as a whole. As warehouse space is often scarce and expensive, alternative storage systems that maximize storage space are desired.

In one alternative approach, which offers a significant improvement in storage density, containers are stacked on top of one another and arranged in adjacent rows. That is, no aisle is provided between the adjacent rows of stacked containers. Thus, more containers, and in turn inventory, can be stored in a given space.

Various methods for retrieving inventory from the stacked containers have been contemplated. U.S. Pat. No. 10,189,641, for example, discloses a system in which containers are stacked and arranged in a plurality of rows underneath a grid. Vehicles equipped with a lifting apparatus navigate the grid and lift a desired container. The container is then transported down a port to a picking/sorting zone, where an operator or robot picks individual products from the container and sorts the products into one or more order containers. To minimize unnecessary transportation of the containers, each container is typically transported to the picking/sorting zone only after multiple orders of a specific product have been received.

Despite the increased storage density provided by the known stacked storage system, various shortcoming remain. For example, order fulfilment times are often lengthy, particularly for products that are ordered infrequently because the containers are retrieved in priority as a function of the number of products of one type that have been ordered. Additionally, the vehicles are required to navigate long distances (which takes considerable time and consumes considerable battery power) while driving bins back-and-fourth to the transportation ports. Furthermore, the required picking/sorting zones reduce the overall storage density of the warehouse and add additional complexity and costs. While the throughput of the stacked storage system can be increased by adding additional vehicles to the grid (or by modifying the system to include additional container transportation ports), there is a limit to the amount of vehicles that can be operated on the grid before the grid becomes overly congested with vehicles and the throughput of the system declines due to gridlock.

BRIEF SUMMARY OF THE DISCLOSURE

In accordance with a first aspect of the present disclosure, a high density storage structure is provided. The storage structure includes support members configured to house a plurality of containers, a first set of parallel rails to support a mobile, manipulator robot and a fluid supply line having a plurality of valves disposed within the supply line. Each of the valves have a closed condition in which the supply line is in fluid isolation from an outside environment and an open condition in which the supply line is in fluid communication with the outside environment such that a mobile, manipulator robot traversing the first set of parallel rail may receive a fluid supply from the fluid supply line when the valve is in the open condition.

In accordance with another aspect of the disclosure, a mobile, manipulator robot for retrieving inventory from the storage structure is provided. The robot may include a body having an interface configured to send processor readable data to a central processor and receive processor executable instructions from the central processor, a mobility assembly coupled to the body, a coupler selectively mateable to a port to receive a fluid supply from a supply line, and a picking arm connected to the body. The picking arm may be coupled to a first pneumatic gripping tool configured to pick inventory items.

In accordance with yet another aspect of the disclosure, a method of controlling a mobile, manipulator robot to retrieve a product stored within a container located in a storage structure is provided. The method may include moving the mobile, manipulator robot over a first set of parallel rails of the storage structure and to a picking location, identifying a grasping region located on a product based at least in part upon image data obtained by a sensor attached to the mobile, manipulator robot, adjusting a picking arm equipped with a pneumatic gripping tool to a grasping pose, and grasping the product using the pneumatic gripping tool.

DETAILED DESCRIPTION

As used herein, when terms of orientation, for example, "vertical" and "horizontal" or relative terms such as, "above," "upwards," "beneath," "downwards" and the like are used to describe the orientation or relative position of specific features of the storage structure or manipulator robot, the terms are in reference to the orientation or the relative position of the features in the normal gravitational frame of reference when the storage structure is positioned with a bottom of the storage structure resting on a surface. Also as used herein, the terms "substantially," "generally," and "about" are intended to mean that slight deviations from absolute are included within the scope of the term so modified.

Figure 1:
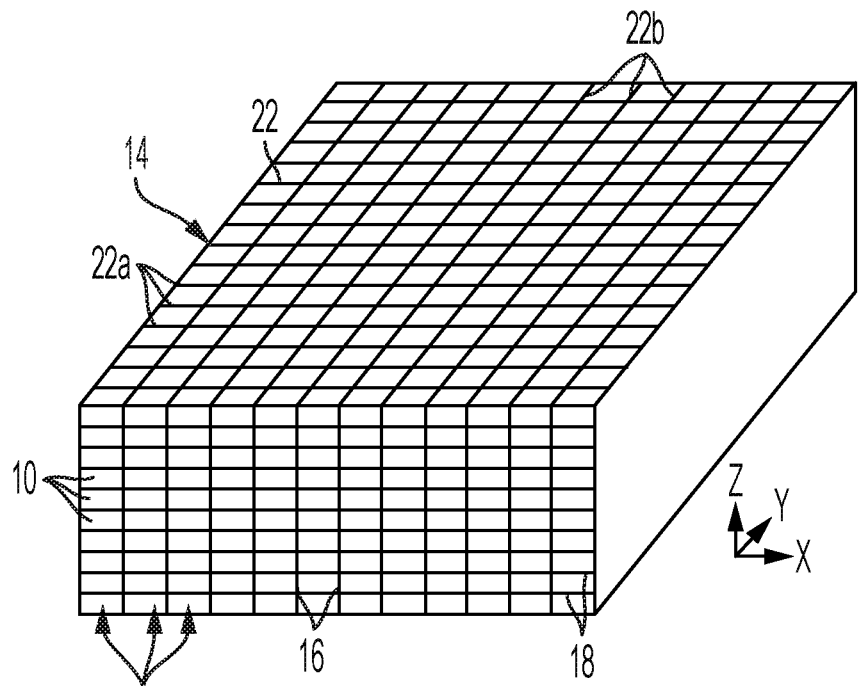
FIG. 1 is a schematic perspective view of a frame structure for housing a plurality of stacked containers in a known storage system.
Figure 2:
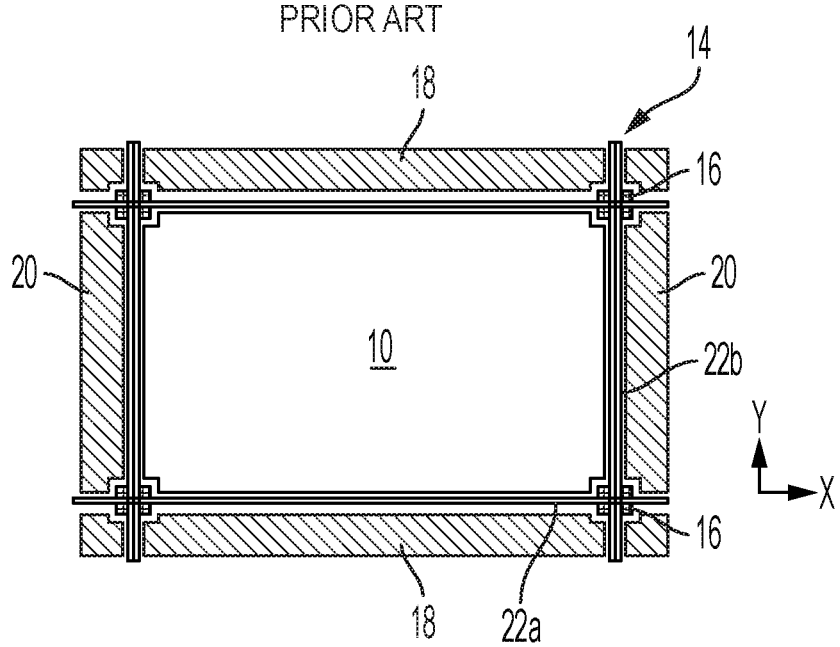
FIG. 2 is a schematic plan view of a portion of the frame structure of FIG. 1.

FIGS. 1 and 2 illustrate a frame structure for efficiently storing a plurality of stackable containers 10, also known as bins, within a storage system according to the prior art. Containers 10 are stacked on top of one another to form stacks 12 and are arranged in a frame structure 14. Each bin 10 typically holds a plurality of product items (not shown). The product items within each bin 10 may be identical, or may be of different product types.

Frame structure 14 includes a plurality of vertical members 16 that support a first set of parallel horizontal members 18 extending in a first direction (e.g., the X-direction), and a second set of parallel horizontal members 20 extending in a second direction (e.g., the Y-direction). Horizontal members 18 and horizontal members 20 form a plurality of horizontal grid spaces within which stacks 12 are housed. Frame structure 14 is thus constructed to guard against horizontal movement of the stacks 12 of bins 10, and to guide vertical movement of the bins.

The uppermost level of frame structure 14 includes rails 22 arranged in a grid pattern across the top of horizontal members 18 and horizontal members 20. With additional reference to FIGS. 3A-3C and 4, rails 22 support a plurality of robotic load handling devices 30. A first set of parallel rails 22a guides movement of load handling devices 30 in a first direction (e.g., the X-direction) across the top of frame structure 14, and a second set of parallel rails 22b, arranged perpendicular to the first set of parallel rails, guides movement of the load handling devices in a second direction (e.g., the Y-direction) across the top of the frame structure. In this manner, rails 22 allow load handling devices 30 to move laterally in two directions (in the X-direction and in the Y-direction) across the top of frame structure 14, so that the load handling devices can be moved into position above any one of the stacks 12 of bins 10.

Each load handling device 30 includes a vehicle 32 with a first set of wheels 34, consisting of a pair of wheels on the front of the vehicle and a pair of wheels on the back of the vehicle, arranged to engage with two adjacent rails of the first set of rails 22a. Similarly, a second set of wheels 36, consisting of a pair of wheels on each lateral side of the vehicle, is arranged to engage with two adjacent rails of the second set of rails 22b. Each set of wheels 34, 36 can be lifted and lowered, so that either the first set of wheels 34 or the second set of wheels 36 is engaged with the respective set of rails 22a, 22b depending on the desired direction of movement of vehicle 32.

When the first set of wheels 34 is engaged with the first set of rails 22a and the second set of wheels 36 is lifted clear from the second set of rails 22b, the first set of wheels can be driven, by way of a drive mechanism (not shown) housed in vehicle 32, to move the load handling device 30 in the X-direction. To move the load handling device 30 in the Y-direction, the first set of wheels 34 is lifted clear of rails 22a, and the second set of wheels 36 is lowered into engagement with the second set of rails 22b. A drive mechanism (not shown) associated with the second set of wheels 36 can then be used to drive the second set of wheels in the Y-direction.

Load handling device 30 is also equipped with a crane device 40 having a cantilever arm 42 that extends laterally from the top of vehicle 32. A gripper plate 44 is suspended from cantilever arm 42 by cables 46 that are connected to a winding mechanism (not shown) housed within vehicle 32. Cables 46 thus can be spooled into or out from cantilever arm 42 to adjust gripper plate 44 with respect to the vehicle 32 in the Z-direction.

Gripper plate 44 is adapted to engage with the top of a bin 10. For example, gripper plate 44 may include pins (not shown) that mate with corresponding holes (not shown) in the rim that forms the top surface of bin 10, and sliding clips (not shown) that are engageable with the rim to grip the bin. The clips are driven into engagement with bin 10 by a suitable drive mechanism housed within gripper plate 44, which may be powered and controlled by signals carried through cables 46, or through a separate control cable (not shown).

Figure 3A:
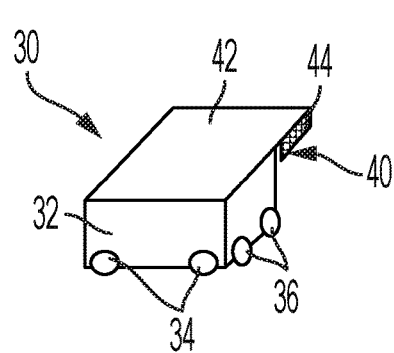
FIGS. 3A and 3B are schematic perspective views, from the rear and front respectively, of a known load handler device for use with the frame structure depicted in FIGS. 1 and 2.
Figure 3B:
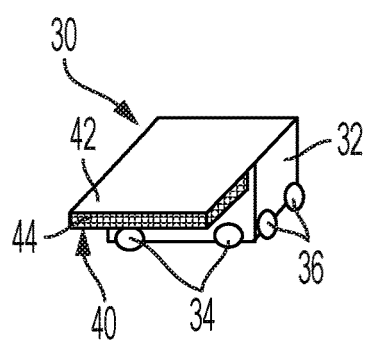
Figure 3C:
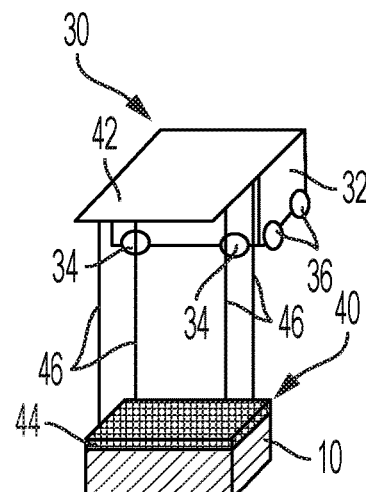
FIG. 3C is a schematic perspective view depicting a container being lifted by the load handler device of FIGS. 3A and 3B.

To remove a bin 10 from the top of a stack 12, the load handling device 30 is moved as necessary in the X and Y directions so that the gripper plate 44 is positioned above the stack in which the desired bin is located. Gripper plate 44 is then lowered and brought into engagement with the bin 10 on top of stack 12, as shown in FIG. 3C. After the clips have engaged with and secured to bin 10, gripper plate 44, and in turn the bin, may then be pulled upwards by spooling cables 46. At the peak of its vertical travel, bin 10 is accommodated beneath cantilever arm 42 and is held above rails 22. In this way, load handling device 30 can transport bin 10 to another location. Cables 46 are long enough to allow handling device 30 to retrieve, and place, bins 10 at any depth within stack 12, including the floor level. Vehicle 32 is sufficiently heavy to counterbalance the weight of bin 10 and to remain stable during the lifting process. Much of the weight of vehicle 32 is attributed to the large and heavy batteries that are required to power and operate the drive mechanisms of wheels 34, 36.

Figure 4:
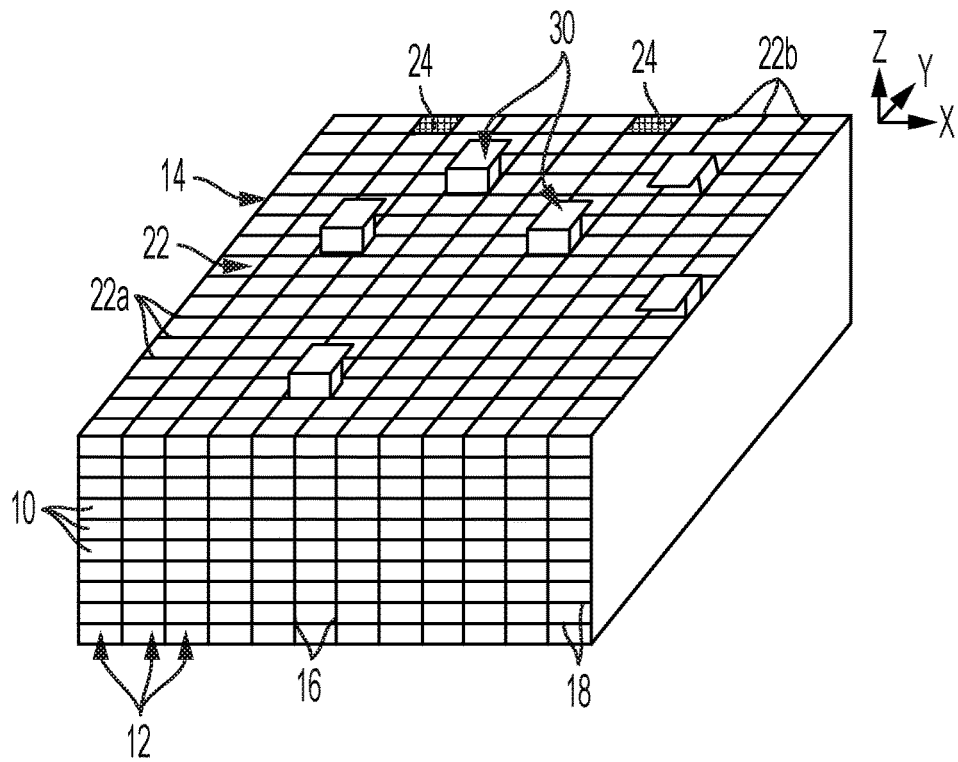
FIG. 4 is a schematic perspective view of the frame structure of FIG. 1 having a plurality of the load handler devices of FIGS. 3A-3C installed on the frame structure.

The known storage system, as shown in FIG. 4, may include a plurality of load handling devices 30 that operate simultaneously to increase the throughput of the system. The system depicted in FIG. 4 includes two ports 24, or shafts, for transferring bins 10 into or out of the system. An additional conveyor system (not shown) may be associated with each port 24. In this manner, bins 10 that are transported to port 24 by load handling device 30 can be subsequently transferred to a picking/sorting station (not shown) where the products contained in the bins are picked and sorted into individual orders. Similarly, bins 10 can be moved by the conveyor system to port 24 from an external location, such as a bin-filling station (not shown), and transported to a stack 12 by the load handling devices 30 to restock the system.

If it is necessary to retrieve a bin ("target bin") that is not located on the top of stack 12, then the overlying bins 10a ("non-target bins") (e.g., the bins located between the target bin 10b and rails 22) must first be moved to allow load handling device 30 to access the target bin. This operation is referred to as "digging".

Figure 5:
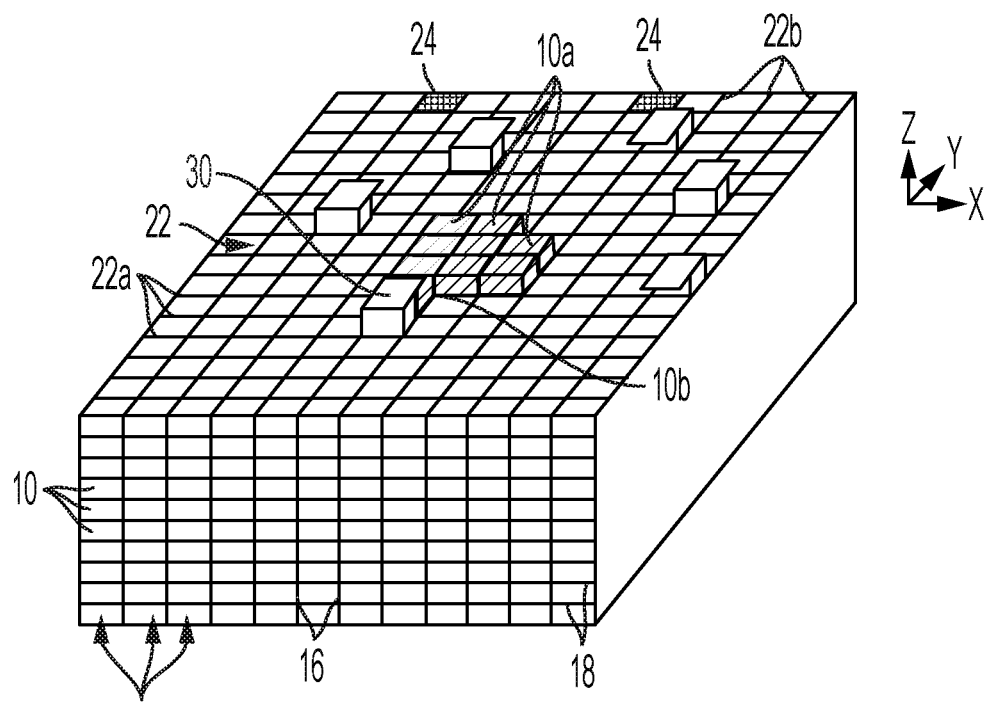
FIG. 5 is a schematic perspective view of the storage system of FIG. 4 depicting a digging operation to retrieve a target container from a stack of containers.

FIG. 5 illustrates a known digging operation in which one of the load handling devices 30 sequentially lifts each non-target bin 10a from the stack 12 of bins 10 containing target bin 10b. Each of the non-target bins 10a may be placed in a temporary location on top of another stack 12. After each of the non-target bins 10a have been removed, target bin 10b can be extracted from frame 14 by load handling device 30 and transported to port 24. After target bin 10b has been extracted, non-target bins 10a may be placed back in the original stack 12 to restore the original order of the stack less the target bin.

Each of the load handling devices 30 may be operated under the control of a central computer. Each individual bin 10 in the system is tracked, so that the appropriate bins can be retrieved, transported and replaced as necessary. For example, during a digging operation, the temporary locations of each of the non-target bins 10a is logged, so that the non-target bins can be replaced in the stack in a particular order.

While the storage system illustrated in FIGS. 1-5 allows for the dense storage of products, it requires the transportation of entire containers of products back-and-forth between the stacks and the picking/sorting zones, during which time products cannot be picked and sorted into new incoming orders, thus reducing total system throughput. In order to minimize bin transportation, target bins 10b are typically only retrieved and transported to the picking/sorting stations after multiple orders have been placed for a product item of one type. Although this method reduces bin transportation, order fulfilment times are often lengthier than desired, particularly if an order contains one or more products that are infrequently ordered by consumers. For this reason, "piece picking" inventory from the known frame structure 14 has been contemplated. U.S. Pat. Pub. Nos. 2018/0319590 and 2018/0346243, for example, disclose a robot equipped with a picking arm to pick individual items from a container located in frame structure 14. Nevertheless, the picking robots and systems disclosed in U.S. Pat. Pub. Nos. 2018/0319590 and 2018/0346243 are not robust enough to handle the picking of a wide variety of products.

The present disclosure, on the other hand, provides a robot having a picking arm equipped with a pneumatic end-effector (e.g., gripping tool) to grasp a variety of products and to place the products directly into one of a plurality of order containers. To date, a major barrier in developing robotic picking arms has been the inability of the picking arm to consistently grasp products of varying sizes, shapes, weights, materials, surface textures, densities, mass distributions, stiffnesses and fragilities. While picking arms equipped with pneumatic gripping tools have been contemplated as one potential solution for gripping a wide variety of products, these gripping tools require extensive suction force and flow rate that can only be produced by large vacuum pumps and/or compressors (e.g., smaller vacuum pumps/compressors are only capable of providing adequate suction for a very small range of items). Oversized pneumatic compressors and/or vacuum pumps, however, are prohibitively large for load handling device 30 or similarly sized vehicles. In other words, load handling device 30 is not capable of carrying a large pneumatic compressor and/or vacuum pump onboard while navigating the rails 22 of frame structure 14, and modifying the load handling device to carry the oversized pneumatic compressor and/or vacuum pump would require a substantially larger vehicle body 32 such that the footprint of the load handling device would consume a large number of grid spaces. As a result, fewer load handling devices would be able occupy the grid at a single time, and throughput of the system would be reduced. For this reason, manipulator robots with pneumatic gripping tools have generally been confined to the floor of a warehouse and are often fixed to a stationary base.

The present disclosure provides a robotic system including a storage structure equipped with a pneumatic air supply system and a compact, manipulator robot with one or more pneumatic gripping tools selectively coupleable to the pneumatic air supply system. As a result, the robot can grasp a large variety of products while traversing across the storage structure and support larger payloads during grasping. The ability of the manipulator robot to quickly and efficiently grasp a wide variety of inventory items is further improved by the robots ability to quickly switch between two or more pneumatic gripping tools and request grasping assistance from a teleoperator, if the robot is unable to autonomously grasp an item during an edge case scenario (or the predicted control instructions have high uncertainty or low confidence) such that the manipulator robot can continue its normal operation with minimal downtime or interruption. These improvements, among other advantages, are discussed in further detail in this disclosure.

Figure 6A:
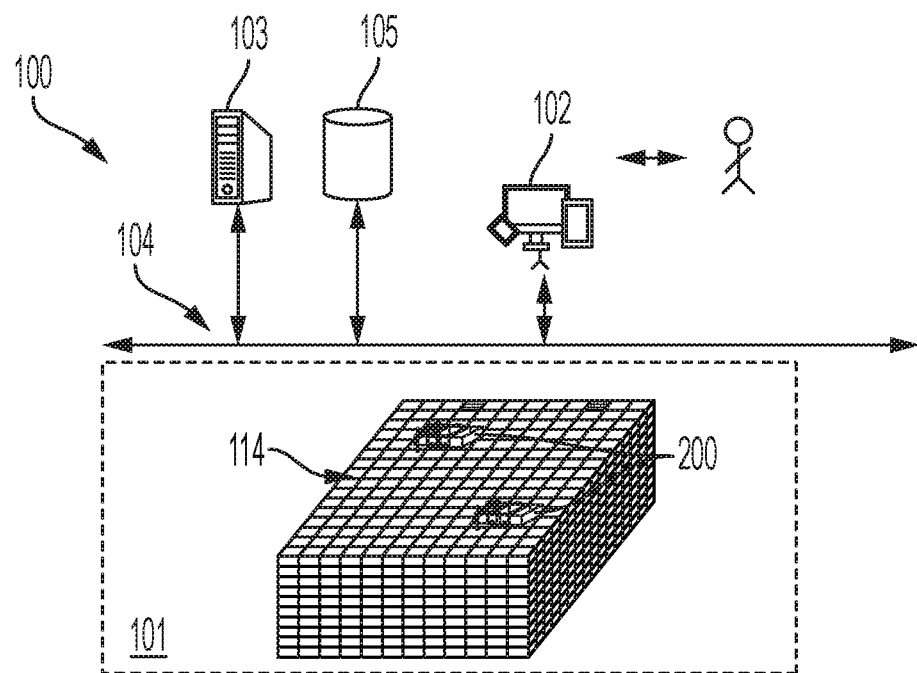
FIG. 6A is a schematic illustration of a robotic system including a storage structure for housing a plurality of stacked containers according to an embodiment of the present disclosure.

FIG. 6A is a schematic illustration of a robotic system 100 according to an embodiment of the present disclosure. A robot, such as manipulator robot 200, may be housed in a warehouse 101, or other fulfillment center, and tasked with picking inventory items contained within storage structure 114. Robot 200 may operate in one of two modes: an autonomous mode, by executing autonomous control instructions, or a tele-operated mode, in which the control instructions are manually piloted (e.g., directly controlled) by an operator. While the term "control instructions" (whether autonomous or piloted) is primarily described herein as instructions for grasping an item, it will be appreciated that the term may additionally refer to a variety of other robotic tasks such as the recognition of an inventory item, the placement or release of a grasped item (e.g., in a particular location or orientation) or any other robotic task that facilitates order fulfillment. In one embodiment, robot 200 may be a machine learning robot capable of executing autonomous or piloted control instructions.

Robotic system 100 includes one or more teleoperator interfaces 102, at least one of which may be located at a remote site outside of warehouse 101, one or more processor-based computer systems 103, each of which are communicatively coupled via one or more network or non-network communication channels 104, and one or more storage devices 105, which stores, for example, a machine learning grasp pose prediction algorithm used to predict new grasping poses for manipulator robot 200 to execute and grasp inventory items. While storage device 105 is illustrated as being separate from computer system 103, in at least some implementations, the storage devices can be an integral part or component of the computer system (e.g., memory such as RAM, ROM, FLASH, registers; hard disk drives, solid state drives).

Operator interface 102 includes one or more input devices to capture control instructions from an operator and one or more output devices. The one or more user interface devices 102 may be, for example, a personal computer, a tablet, (smart) phone, a wearable computer, and the like. Exemplary input devices include keyboards, mice, touch screen displays, displays (e.g., LCD or OLED screen), controllers, joysticks and the like. Exemplary output devices include, without limitation, displays (e.g., LCD or OLED screen), head mounted displays, speakers, and/or haptic feedback controllers (e.g., vibration element, piezo-electric actuator, rumble, kinesthetic, rumble motor). Operator interface 102 thus may be utilized by an operator to observe robotic picking, for example, aspects of manipulator robot 200 and/or the inventory stored within storage structure 114. Operator(s) may view or see a representation of manipulator robot 200 performing one or more tasks such as grasping an item by reviewing one or more still and/or moving images of the manipulator robot and/or its environment. These images and/or video may be replayed and/or viewed in real time. If manipulator robot 200 is unsuccessful at autonomously performing the task, the operator can utilize operator interface 102 and instruct the robot to perform one or more robotic tasks such as grasping a product item and/or releasing the product item into a desired order container. Although operator interface 102 is primarily designed to assist robot 200 in performing tasks that the robot is struggling to perform, such as grasping, it will be appreciated that a teleoperator can utilize the operator interface at any time (including prior to a failed grasping attempt) to manually control the robot to perform any manipulation task and/or override autonomous control instructions.

Computer system 103 coordinates the operation of robotic system 100. Computer system 103 can be a processor based computer system. The processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. In some implementations, computer system 103 may include a control subsystem including at least one processor. Computer system 103, the at least one processor and/or the control subsystem may be interchangeably referred to herein as the processor, the controller, the central computer, the computer, the server or the analyzer.

Examples of a suitable network or non-network communication channels 104 include a wire based network or non-network communication channels, optical based network or non-network communication channels, wireless (i.e., radio and/or microwave frequency) network or non-network communication channels, or a combination of wired, optical, and/or wireless networks or non-network communication channels.

Mobile, manipulator robot 200 includes an interface to send and/or receive processor readable data or processor executable instructions via communication channels 104 to computer 103. In this manner, computer 103 can predict grasping poses (e.g., position and/or orientation and/or posture of the robotic picking arm) based on inventory item data (e.g., the geometry and material of an item and its specified pose) and send control instructions to manipulator robot 200 to execute the predicted grasping pose and grasp the product item. If the control instructions are unsuccessful in performing a task (e.g., grasping the item), or the central computer determines that the predicted control instructions are unlikely to be successful, the system can automatically request intervention from the operator, allowing robot 200 to be teleoperatively controlled from a local or remote location.

As will be described in greater detail hereinafter, the present system allows a teleoperator to remotely pilot manipulator robot 200 and move the robot into a variety of grasping (or manipulation) poses to train the machine learning system to more accurately predict future autonomous robot control instructions.

Although FIG. 6A illustrates two robots 200 located within a single warehouse 101, it will be appreciated that the system can include a single robot or any number of robots located within a single warehouse, or one or more robots located within a plurality of warehouses. The robotic system is thus advantageously configured to allow one or more operators to teleoperatively pilot or control a plurality of manipulator robots 200, via one or more operator interfaces 102, from a site located local or remote to the warehouses in which the robots are contained.

Figure 6B:
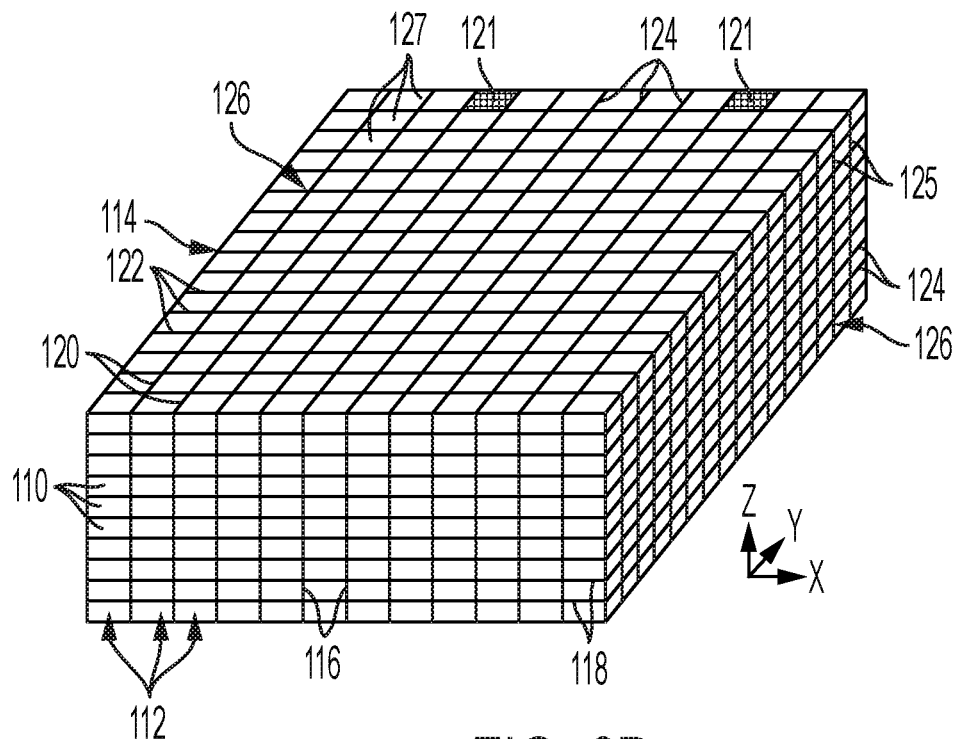
FIG. 6B is a schematic perspective view of the storage structure of FIG. 6A.

Storage structure 114, as shown in FIG. 6B, is configured to efficiently store stackable containers 110, also referred to as bins. The containers 110 are stacked on top of one another to form stacks 112. Each bin 110 is configured to hold a plurality of product items (not shown) which may be identical, or of different product types. Containers 110 preferably have an open end through which the products can be retrieved. The open end of container 110 may be an open top end or an open lateral side. The bottom of containers 110 may be inwardly tapered to facilitate the rolling and/or the sliding of inventory products toward the center of the container and away from the sidewalls to facilitate picking, and in some cases may include slidable, pivotable or bomb bay doors to dump the inventory items into other containers or elsewhere.

Storage structure 114 includes vertical members 116 that support a first set of horizontal members 118 extending in a first direction (e.g., the X-direction), and a second set of horizontal members 120 extending in a second direction (e.g., the Y-direction). Horizontal members 118 and horizontal members 120 form a plurality of horizontal spaces for housing stacks 112. The horizontal spaces are constructed to guard against lateral movement of the stacks of bins 110. Storage structure 114 may additionally include one or more ports 121 or shafts to transfer bins into or out of the storage structure. A conveyor belt or shuttle system (not shown) may be associated with each port 121 to transport bins 110 to an external location. For example, a bin containing products for shipment may be transported down port 121 to an external location for further packaging and/or shipment, while an empty bin may be transported down the port to a bin-filling station (not shown) for replenishment, and then subsequently transported up the port and to one of the stacks 112 to restock the storage structure.

The uppermost level of storage structure 114 may include a first set of rails 122 extending in a first direction (e.g., X-direction), and/or a second set of rails 124 extending in a second direction (e.g., the Y-direction). In embodiments in which storage structure 114 includes the first set of rails 122 and the second set of rails 124, the combination of the first and second set of rails forms a horizontally oriented grid 126 having a plurality of grid spaces 127. Rails 122, 124 allow one or more robots to move about the grid 126 above the stacks 112 of bins 110. At least one of the vertical members 116, horizontal members 118, horizontal members 120 or rails 122, 124 may define a channel that transports fluid such as compressed air to the robots installed on grid 126 as is discussed in further detail hereinafter.

Figure 6C:
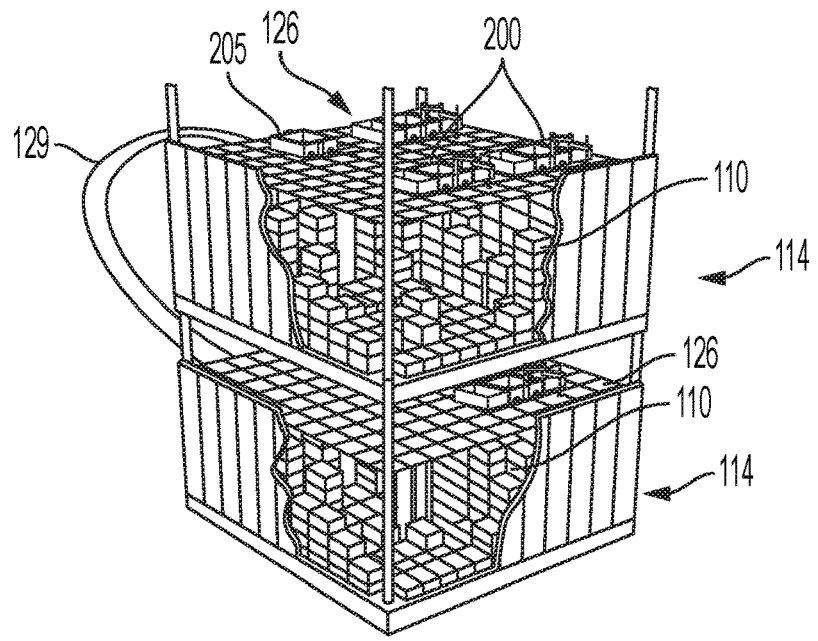
FIG. 6C is a schematic perspective view of two storage structures arranged on top of one another according to another embodiment of the present disclosure.

As shown in FIG. 6C, a plurality of similarly constructed storage structures 114 with shallower stacks (e.g., fewer containers per stack) may be layered on top of one another to reduce the time it takes to dig a target container 110b (e.g., the container storing a desired product), which in turn, increases the throughput of the system. In such scenarios, each storage structure 114, or level, would be spaced apart from an adjacent level with enough clearance between each level to allow one or more robots to move about a respective grid 126. One or more elevators and/or ramps having inclined and/or declined rails 129 (in the Z-direction) may be provided between the grids 126 of adjacent storage structures 114 to allow the robots to migrate between the levels as desired.

Referring back to FIG. 6B, one or more of the lateral sides of storage structure 114 may additionally or alternatively include the second set of rails 124 extending in the second direction (e.g., Y-direction), and/or a third set of rails 125 extending in a third direction (e.g., Z-direction). In embodiments in which storage structure 114 includes the second set of rails 124 and the third set of rails 125, the combination of the second and third set of rails 124, 125 forms a vertically oriented grid 126 having a plurality of grid spaces 127. Manipulator robot 200 may traverse vertical grid 126, extract bins 110, and pick from the extracted bins housed in shelving, racks or stacks on the lateral sides of storage structure 114. When the term "grid" is used herein without an orientation qualifier (e.g., vertical or horizontal), the term may refer to any grid structure formed by a combination of rails 122, 124, 125, whether the grid be horizontally oriented or vertically oriented.

It is also envisioned that a plurality of similarly constructed storage structures 114 may be positioned laterally adjacent to one another (not shown), to increase storage capacity. In such scenarios, each storage structure 114 would be spaced apart from an adjacent storage structure with enough space between the adjacent storage structures to allow a robot 200 to traverse about a respective vertically oriented grid 126 and access containers 110 housed within either of the adjacent storage structures.

Figure 7A:
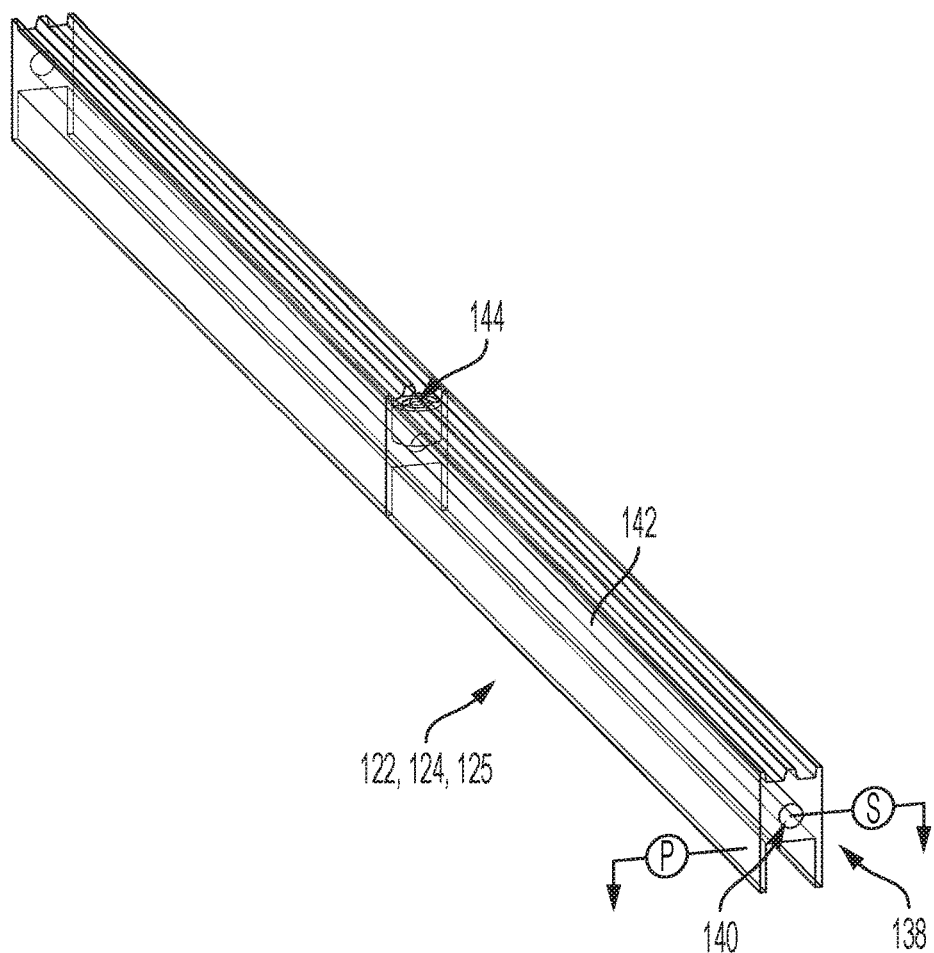
FIG. 7A is a perspective view of a rail depicting a channel extending through the rail and a conduit extending from the channel to a surface of the rail.
Figure 7B:
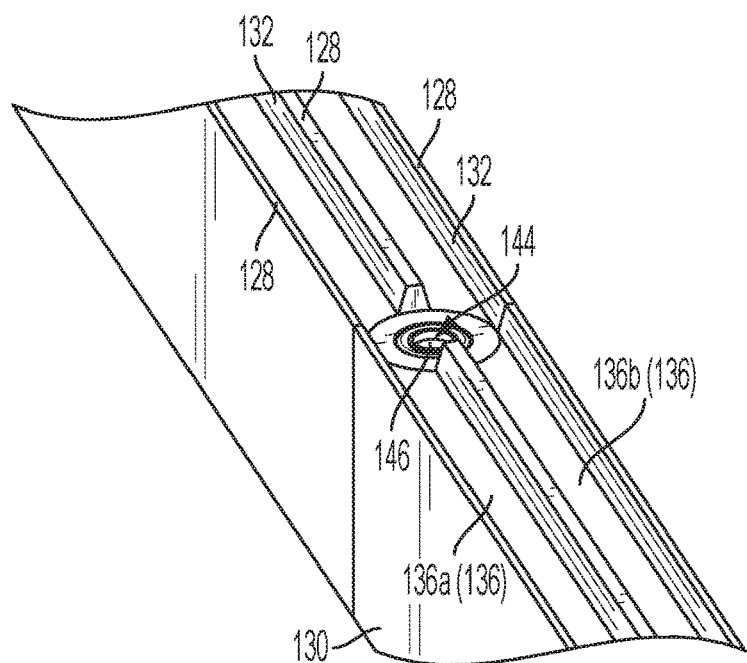
FIG. 7B is an enlarged view of a portion of the rail of FIG. 7A.

Referring to FIGS. 7A and 7B, each one of the rails 122, 124, 125 forming grid 126 may be extruded or otherwise formed from a highly conductive metal such as aluminum. A power source P may be coupled to grid 126 to supply a voltage to rails 122, 124, 125 and, in turn, to selectively provide a voltage to robot 200 to recharge small batteries or super/ultra-capacitors of the robot and/or directly power the various drive mechanisms of the robot. The power may be transferred from grid 126 to robot 200 in one of several methods. For example, grid 126 may have a single polarity such as a negative charge, while a structure or ceiling above the grid (not shown) is positively charged (or vice versa). In this embodiment, robots 200 may include an antenna which contacts the positively charged structure or ceiling above grid 126 and completes the circuit between the opposite polarities. In an alternative arrangement, adjacent rails of one set of the parallel rails 122, parallel rails 124 and/or parallel rails 125 may have opposite polarities such that when robot 200 is disposed on the adjacent parallel rails, the wheels, or conductive brushes (e.g., contact elements), of the robot will complete the circuit. For example, a first one of the parallel rails 122 may have a positive polarity while an adjacent one of the parallel rails 122 may have a negative polarity. In this manner, robot 200 need not include the large onboard batteries associated with load handling device 30. As a result, robot 200 is less bulky and more maneuverable than its load handling device 30 counterpart.

Rails 122, 124, 125 may include a double u-channel or profiled track having an upper surface 128, outer surfaces 130, inner surfaces 132 and drive surfaces 136a, 136b (collectively "drive surfaces 136"). In this manner, two robots may traverse a single rail 122, 124, 125, increasing the number of robots capable of driving on grid 126 at any given time. For example, a first robot supported on drive surface 136a may pass a second robot supported by drive surface 136b. The upper surface 128, outer surfaces 130 and inner surfaces 132 of rails 122, 124, 125 may be anodized or painted with a non-conductive coating to prevent the robot or storage structure 114 from short circuiting and to minimize the risk of electrocution. In other words, the inner drive surfaces 136 of rails 122, 124, 125 may be the only surfaces of the rails that remain at least partially or entirely electrically charged (aside from the terminal ends, or a small section of the terminal ends of the rails, which are not anodized for the purpose of transmitting power along the rails of the grid).

Figure 9A:
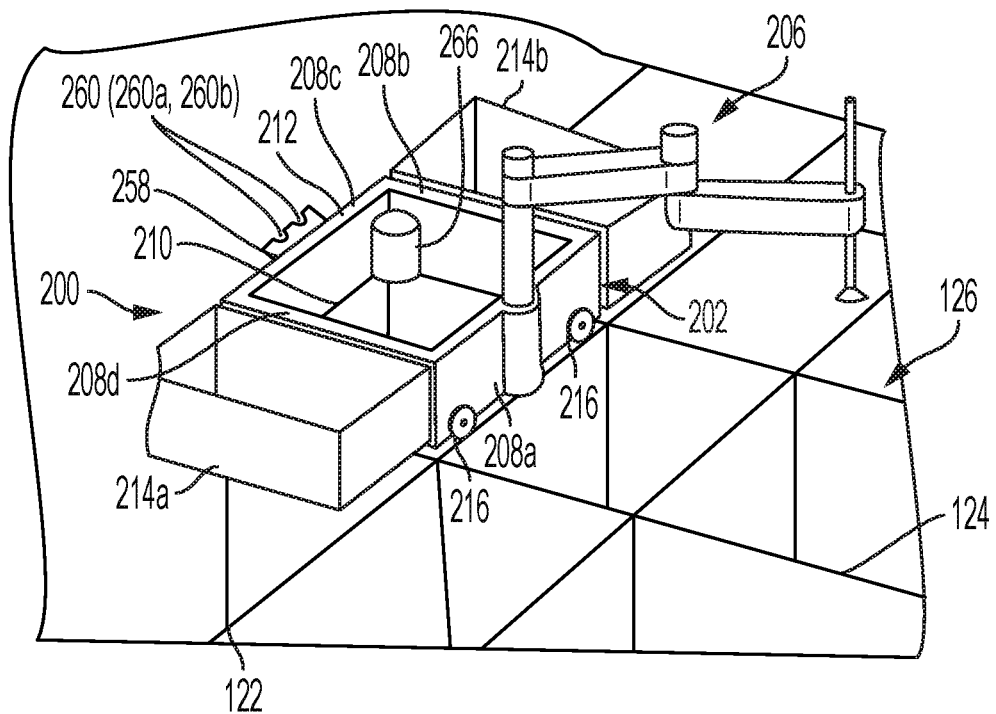
FIG. 9A is a schematic perspective view of a manipulator robot including a picking arm equipped with a pneumatic gripping tool and a tool holder, installed on top of the storage structure of FIG. 6B.

Storage structure 114 further includes a fluid supply system 138 configured to supply fluid such as compressed air to robot 200 when the robot is installed on rails 122, 124, 125. Fluid supply system 138 thus eliminates the need for robot 200 to carry a bulky onboard air compressor or vacuum generator to grasp inventory items using its pneumatic gripping tool 248 (FIG. 9A). Fluid supply system 138 includes a fluid source S and a supply line 140. Fluid source S may be a compressor, such as a pneumatic compressor, to supply compressed air to supply line 140. Alternatively, fluid source S may be a vacuum pump or vacuum generator.

While supply line 140 is primarily described and illustrated herein as extending through the rails 122, 124, 125 of grid 126, it will be appreciated that the supply line may alternatively be formed by or extend at least partially through the channels of vertical members 116, horizontal members 118 or horizontal members 120 forming the frame of storage structure 114, be attached to or otherwise coupled to an external surface of the rails and/or the frame structure, or otherwise be in close proximity of the rails so long as the fluid supply is accessible to manipulator robot 200 when the robot is positioned on the grid.

As shown in FIG. 7A, supply line 140 may include a series of channels 142, conduits 144 and ports 146. Channels 142 may extend along an entire length of rails 122, 124, 125, and are preferably, embedded within a lower portion of the u-channel such that the channels extend continuously in a longitudinal direction of a respective rail without interruption at the intersections of rails 122 and rails 124, or the intersection of rails 124 and 125. A plurality of conduits 144 may extend between channel 142 and a port 146 located at a surface of a respect rail. In a preferred embodiment, at least one of rails 122, 124, 125 that surrounds each one of grid spaces 127 has a conduit 144. Grid 126 is thus capable of supplying fluid such as compressed air to robot 200 irrespective of the robot's location on the grid.

Figure 8A:
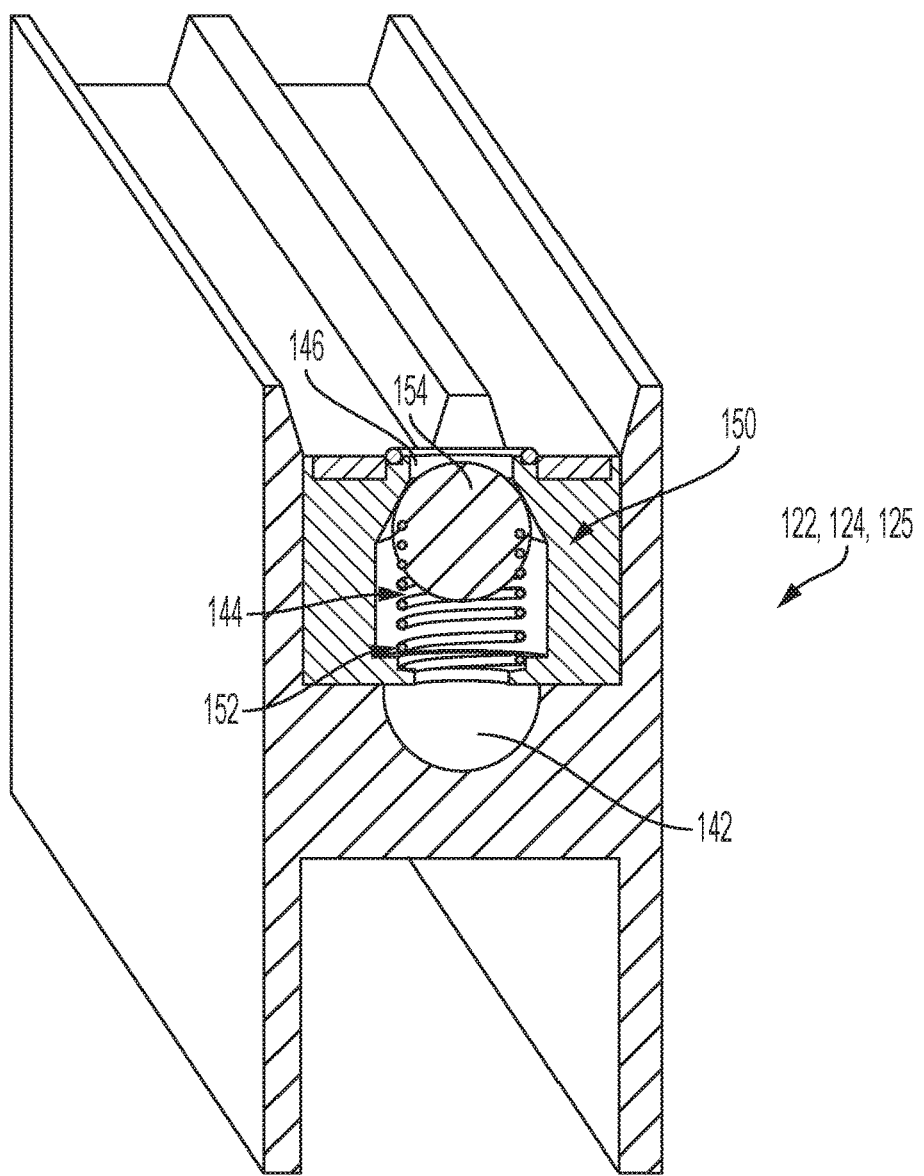
FIG. 8A is a cross-section view of a valve disposed within the conduit of the rail of FIGS. 7A and 7B.
Figure 8B:
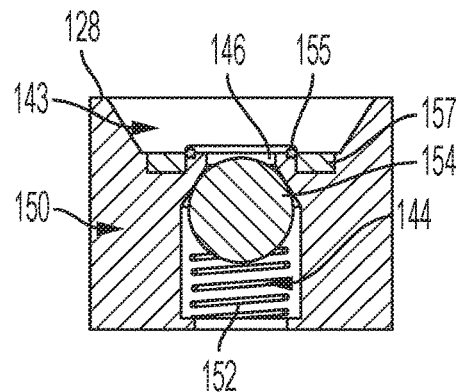
FIG. 8B is an enlarged view of a portion of the rail of FIG. 8A.

Referring to FIGS. 8A and 8B, a plurality of valves 150 may be disposed within supply line 140, for example, within the channels formed by vertical members 116, horizontal members 118, horizontal member 120, or within the channels 142 of the conduits 144 of rails 122, 124, 125. Each valve 150 is transitionable between a closed condition in which the compressed air is contained within supply line 140, and an open condition in which the supply line is in fluid communication with the environment such that compressed air may be supplied to manipulator robot 200. Each valve 150 may include a biasing member 152, such as a spring, and a plug 154 coupled to the spring to seal port 146. When spring 152 is in a neutral or unbiased condition, the spring 152 biases the plug into the port 146, which seals the compressed air within supply line 140. Alternative valves may be used to seal compressed air within supply line 140. For example, the valve may be constructed as any passively or actively actuated valve capable of being transitioned between a closed condition and an open condition, such as an electrohydraulic servo valve.

With specific reference to FIG. 8B, the rails 122, 124, 125 of grid 126 may define a cavity 143 aligned with a longitudinal axis of conduit 144. Cavity 143 may include a tapered edge extending from the upper surface 128 of rails 122, 124, 125 toward port 146. A magnet 157, or other ferrous material, may surround port 146 to magnetically couple robot 200 to grid 126 during the transference of the compressed air from supply line 140 to robot 200. A gasket, such as an O-ring 155, may be provided around port 146 to seal the connection between robot 200 and grid 126, and/or at any other location surrounding the valves 150 to prevent compressed air from leaking out of supply line 140.

Figure 9B:
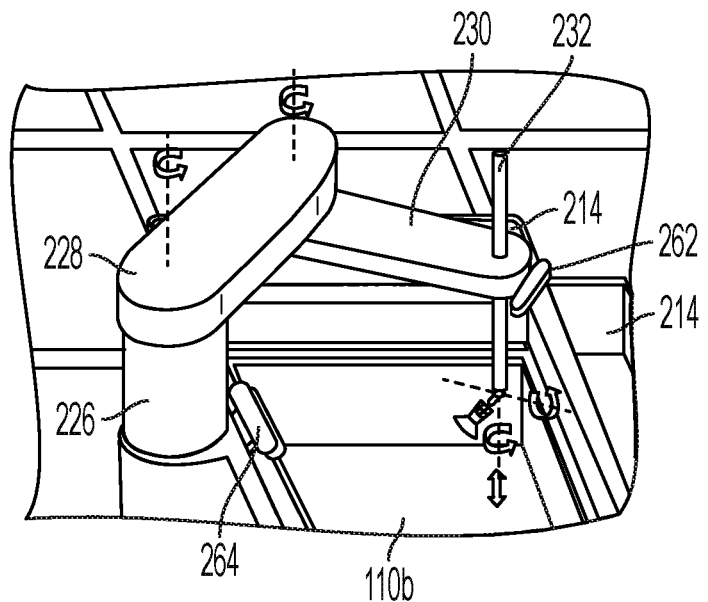
FIG. 9B is a schematic enlarged view of a portion of the robot of FIG. 9A.

The compressed air of supply system 138 may be selectively accessed by mobile, manipulator robot 200, shown in FIGS. 9A and 9B, to provide the necessary suction to allow the manipulator robot to piece-pick inventory items ranging in sizes, shapes, weights, materials, surface textures, densities, mass distributions, stiffnesses and fragilities.

Referring to FIGS. 9A and 9B, manipulator robot 200 includes a vehicle body 202, a mobility assembly 204 configured to guide movement of the vehicle body along rails 122, 124, 125 and a picking arm 206. Manipulator robot 200 also includes a communication interface to send and receive data between the manipulator robot and central computer 103 and/or the manipulator robot and teleoperator interface 102. The data may include information relating to the position of manipulator robot 200 to enable central computer 103 to control movement of the robot about grid 126 or about warehouse 101 in general. The data may also include sensor data relating to or providing Product Information (e.g., location, dimensions, shapes, weights, materials, porosities, surface textures, colors, densities, mass distributions, stiffnesses, fragilities or the like) that assist the computer or a teleoperator in distinguishing between different products located in the container and/or predicting a grasping pose for grasping the product item.

Vehicle body 202 may be formed of four sidewalls 208a, 208b, 208c, 208d (collectively "sidewalls 208"), an open bottom end 210 and an open top end 212. The sidewalls 208 are preferably sized such that vehicle body 202 has a footprint of a single grid space 127. In other words, when robot 200 is positioned on the horizontal grid 126, two opposing sidewalls (e.g., 208a, 208c) are positioned over two adjacent rails 122 extending in the X-direction, while the other two opposing sidewalls (e.g., 208b, 208d) are positioned over two adjacent rails 124 extending in the Y-direction. In other embodiments, the vehicle body 202 of robot 200 may have a footprint that is larger than a single grid space 127. The open bottom end 210 and the open top end 212 of vehicle body 202 allow picking arm 206 to extend through the vehicle body and grasp a product contained in a target bin 110b, which may be located directly beneath the body (e.g., the bin located on the top of the stack of bins aligned with the vehicle body in the Z-direction). Picking arm 206 may alternatively be used to pick products contained in target bins located laterally adjacent to the vehicle body 202 as shown in FIG. 9A.

Figure 6D:
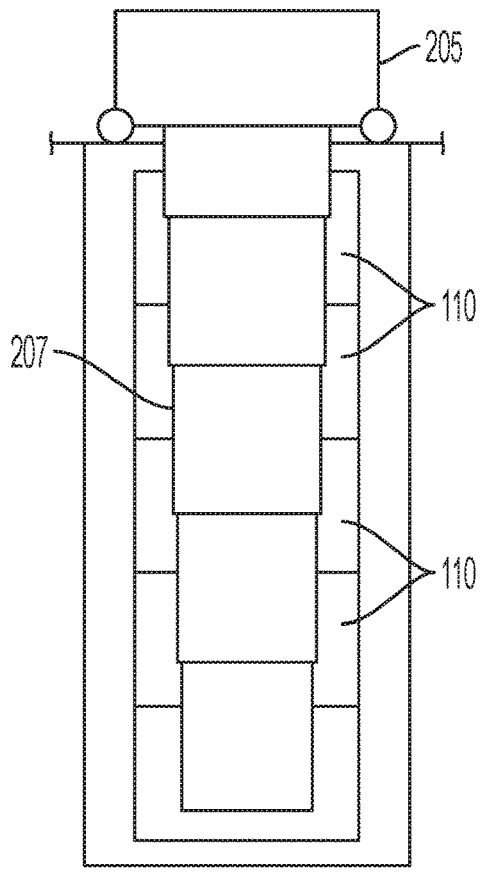
FIG. 6D is a schematic side elevation view of a digging robot performing a digging operation within the storage structure of FIG. 6B.

One or more of the sidewalls 208 of vehicle body 202 may optionally include a pivotable digging plate (not shown) for digging into a stack 112 and pulling a target bin to the top of a particular stack and/or for transporting bins for replenishment purposes. The digging plate may be pivotable between a collapsed condition in which the digging plate lies flush against a respective interior or exterior surface of the sidewall 208 of vehicle body 202, and an operating condition in which the digging plate extends radially away from and perpendicular to the respective sidewall of the vehicle body. The digging plate may be similar to gripper plate 44 of load handling device 30 in that the digging plate is configured to be lowered in the Z-direction and brought into engagement with any of the bins 110 located in stack 112. Like gripper plate 44, the digging plate may be adapted to pull bins 110 upwards by spooling cables, which are long enough to retrieve a target bin located at any depth within stack 112. However, robot 200 need not include a digging plate or another mechanism for digging the containers from stack 112. System 100 could instead rely on the combination of manipulator robot 200 and a separate robot specifically adapted to perform digging tasks. The digging robot may be known load handling device 30 or digging robot 205 (FIGS. 6C and 6D). With specific reference to FIG. 6D, digging robot 205 may include a vehicle body having a container receiving cavity and a digger 207 extendable beneath the body. Digger 207 may be a scissor lift or include a series of telescoping beams or other compact linear actuators with long stroke. In this manner, digger 207 may reach beneath grid 126 to lift a single container 110, or a plurality of containers (e.g., a target bin and each of the non-target bins overlying the target bin), through the receiving cavity and above the grid in a single lift. Alternatively, digger 207 may be positioned on a single external side of digging robot 200 and include a latching device such as a hook for engaging with a lateral side of containers 110. In this manner, digging robot 205 may reach beneath grid 126 to lift a single container 110, or a plurality of containers (e.g., a target bin and each of the non-target bins overlying the target bin) above the grid and on a lateral side of the digging robot (e.g., without lifting the containers through the digging robot). The digger 207 of digging robot 205 may be electrically, pneumatically or otherwise actuated.

The internal surface of the sidewalls 208 of robot 200 may also include a latch, hook, plate or other mechanism (not shown) for coupling order bins 214a, 214b (collectively "order bins 214") within the vehicle body 202 of the manipulator robot such that the combination of the piece picking robot and the one or more order bins have a footprint of approximately one grid space 127. The latch, hook, digging plate or other mechanism may alternatively be placed on an external surface of one or more of the sidewalls 208 of vehicle body 202 to couple order bins 214 around the vehicle body as shown in FIGS. 9A and 9B.

Each of the order bins 214 may correspond to one or more orders. If a single order bin corresponds to more than one order, the bin may be partitioned to separate the multiple orders in a single bin, or remain un-partitioned with all of the items from multiple orders mixed together. For example, order bin 214a may correspond to a first consumer's order and order bin 214b may correspond to a second consumer's order. Thus, after robot 200 has picked a product from target bin 110b, the product may be placed directly into the order bin corresponding to the order of the consumer who purchased the product. In one embodiment, the bottom end of order bins 214 may include slidable, pivotable or bomb bay doors to facilitate the dumping of items into other containers, areas, or down ports 121 for further sorting or processing. It will be appreciated, however, that piece picking robot 200 need not carry any order bins 214. Instead, piece picking robot 200 may be used only for grasping products, which may be subsequently placed into order bins 214 carried by a "transporting robot" (e.g., a robot whose primary responsibility is carrying around order bins) (not shown). In this manner, both manipulator robot 200 and the transporting robot may move along grid 126 and meet at certain picking or transfer locations.

With specific reference to FIG. 9B, robot 200 further includes one or more sensors 262 such as a camera, video recorder, Light Detection and Ranging (LIDAR), and the like, oriented to capture pictures, point clouds, video etc. (generally referred to herein as "an image" or "images") of the product item(s) stored within containers 110. The image(s) may then be transmitted via network or non-network communication channels 104 to processor 103 which, in some instances, may additionally be relayed to operator interface 102. In this manner, processor 103 may implicitly or explicitly analyze the images and then execute a machine learning algorithm, located on storage device 105 to predict a grasping pose to grasp the desired product item, before transmitting the grasping pose control instructions to robot 200 via communication channels 104 which, when executed by the robot, causes the picking arm 206 of the robot to approach and attempt to grasp the item. Although the grasping pose can refer to a single pose, grasping an item often requires a set of consecutively run poses. As used herein, the term 'grasping pose' may refer to a single pose or a set of consecutively run poses. The images are preferably continuously captured as robot 200 traverses grid 126 and transmitted to central computer 103. In this manner, central computer may determine a grasping pose for the picking arm 206 of robot 200, or the picking arm of another manipulator robot, before the manipulator robot reaches the picking position, thus increasing throughput of robotic system 100.

Figure 9C:
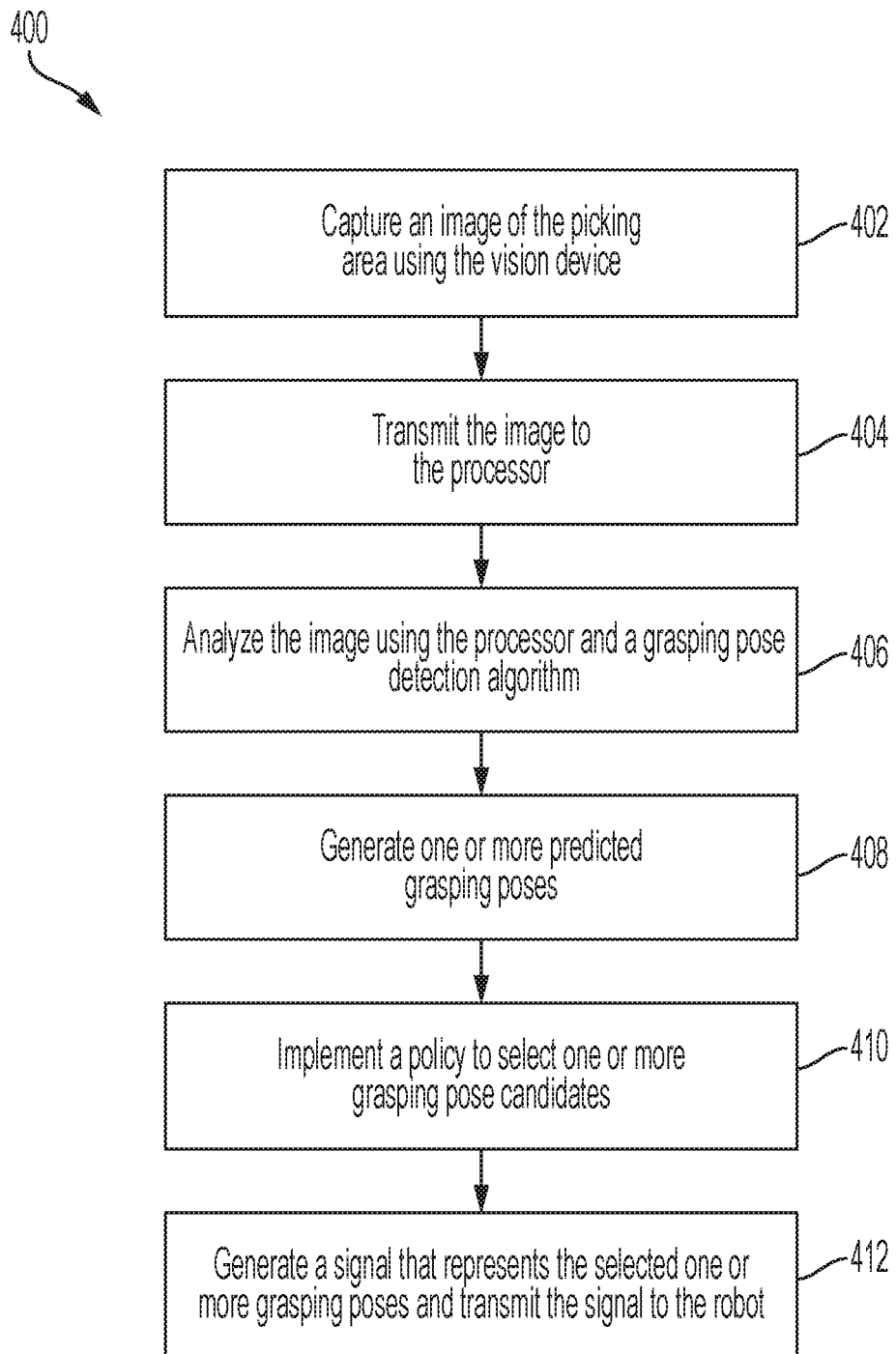
FIG. 9C is a flow chart showing an example method of determining a grasping pose of the picking arm of the robot of FIG. 9A.

FIG. 9C is a flow chart showing a method 400 of autonomously determining a grasping pose. The process for determining a grasping pose may begin, at 402, with a command from processor 103 that instructs sensors 262 to capture an image of the inventory disposed within a target container 110b.

The image(s) may then be transmitted, at 404, over network or non-network communication channels 104 to processor 103. Upon receipt of the image, processor 103 may analyze the images and the Product Information of the items stored within the target container 110b.

Based on the Product Information, processor 103 may execute one or more grasping pose detection algorithms (which can be neural networks or machine learning algorithms stored on storage device 105) to predict one or more grasping pose candidates. Processor 103 may then implement a policy, at 410, which utilizes one or more metrics, checks and filters to select one or more of the predicted grasping pose candidates for robot 200 to execute sequentially or to add to its queue. Then, at 412, processor 103 produces, makes, or generates a signal including processor readable information that represents the selected grasping pose and sends the signal through communication channels 104 to robot 200. It will be appreciated, however, that robot 200 can alternatively run part of, or the entirety of, the grasping model on an onboard computer rather than relying on remote computing and communications.

Figure 9D:
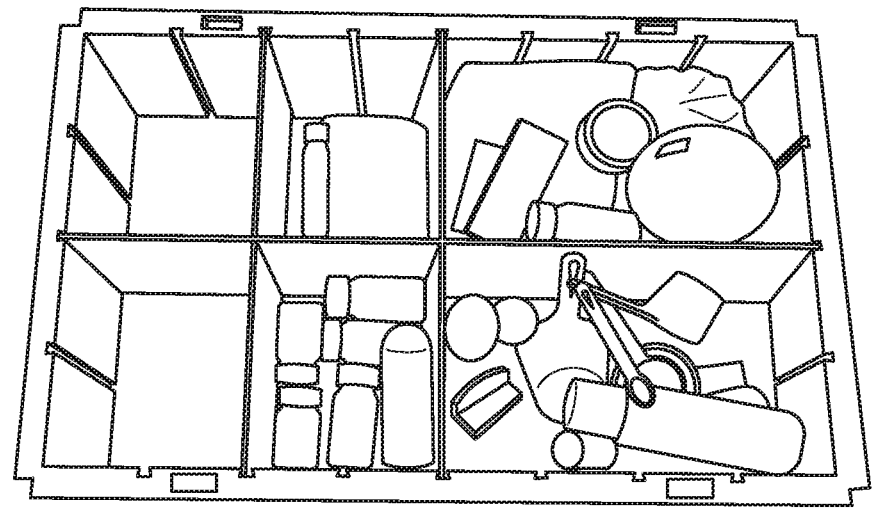
FIGS. 9D and 9E are schematic illustrations of grasping regions of product items stored within a container.
Figure 9E:
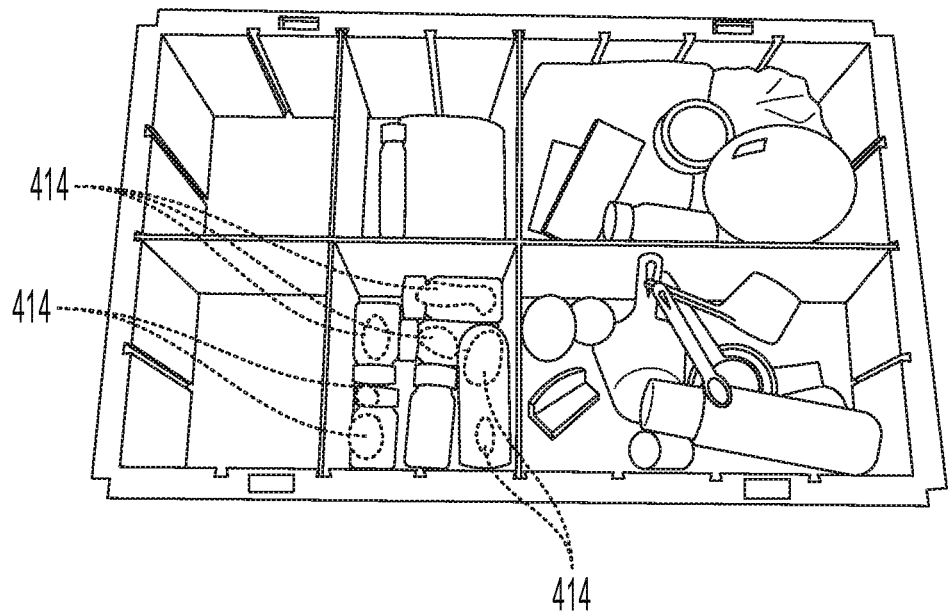

As shown in FIGS. 9D and 9E, sensors 262 and the grasping model may work in concert to identify a grasping region 414 of product items, defined as a specific area on the product item or packaging of the product item as a whole that manipulator robot 200 has a high likelihood of successfully grasping. Grasping region 414 may be a relatively non-porous and flat surfaced region of the product item and/or the product packaging. FIG. 9D illustrates product items of different types within a target container 110b. FIG.

9E illustrates the identification of a grasping region 414 of the product items located within an area of the target container.

Figure 10:
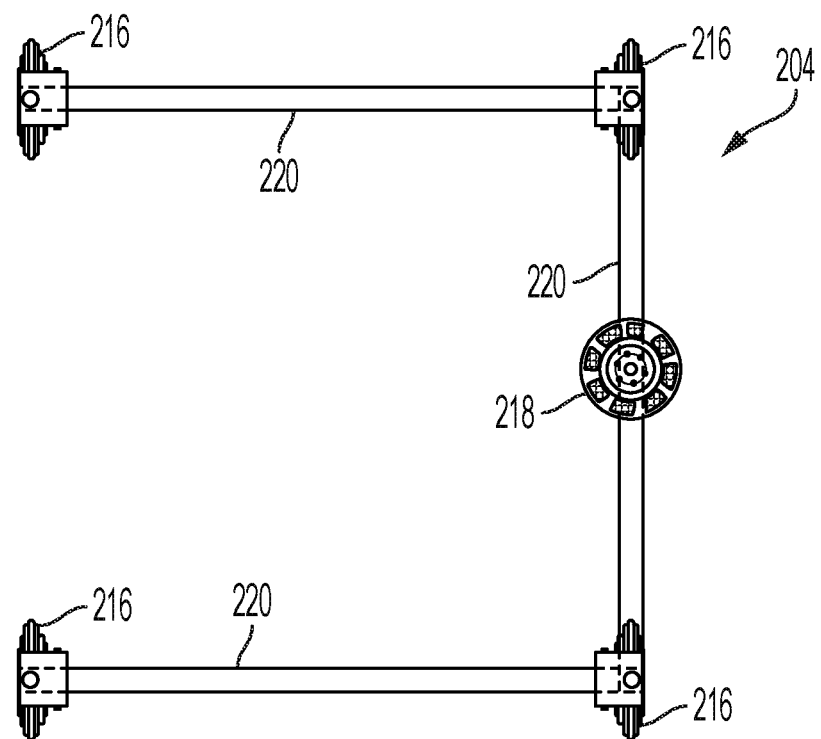
FIG. 10 is a top elevation view illustrating a mobility assembly of the robot of FIG. 9A.

Referring to FIG. 10, mobility assembly 204 is configured to guide movement of vehicle body 202 along rails 122, 124, 125 and position robot 200 over, or laterally adjacent to a target bin 110b (e.g., a bin containing the product to be picked). Mobility assembly 204 may include a plurality of wheels 216, a motor 218 and one or more transmissions (belts or linkages) 220 operably coupling each one of the wheels to the motor. Each one of the wheels may include a direct drive (not shown), a hub motor (not shown), a gear drive actuator (not shown) or a belt drive actuator (not shown) to rotate wheels 216 and move vehicle body 202 along the rails in which the wheels are positioned. Mobility assembly 204 may include four wheels 216, with one wheel being located at or adjacent to each one of the corners of vehicle body 202. The orientation of wheels 216 is controlled by motor 218 and transmission 220. More specifically, transmission 220 couples motor 218 to each one of wheels 216 such that rotation of the motor simultaneously rotates/pivots the orientation of each one of the wheels 216 between a first orientation in which each of the wheels are oriented, for example, along rail 122, and a second orientation in which the wheels are aligned with rail 124 (i.e., 90 degrees). The four wheels 216 can thus be used to guide movement of vehicle body 202 in two directions, for example, along rails 122 (e.g., X-direction) and along rails 124 (e.g., Y-direction). Consequently, robot 200 need not include a second set of wheels or a separate drive mechanism for lifting and disengaging the second set of wheels each time the robot drives along a different rail, as is the case with known load handling device 30.

The mobility assembly 204, or body 202, of manipulator robot 200 may further include one or more electrical brushes or conductive elements 221 (shown in FIG. 14B) to engage the inner drive surfaces 136a, 136b of grid 126 and transfer the charge from the grid to a relatively small onboard battery or super/ultra-capacitor, and in turn, to the drive motor or gear drive actuator. As a result, robot 200 may charge its battery or super/ultra-capacitor while robot 200 traverses grid 126. The throughput of the system is thus increased because robot 200 need not be removed from grid 126 and/or paused in order to charge or swap its battery or super/ultra-capacitor. The relatively small onboard battery or super/ultra-capacitor also allows robot 200 to be lighter, faster and safer than its load handling device 30 counterpart. Moreover, the small battery or super/ultra-capacitor may temporarily power the drive motor and/or gear drive actuator to drive the wheels even when robot 200 is removed from and driven off of grid 126. Robot 200 may be driven, for example, on the warehouse floor in any direction to navigate the robot between grids 126 and/or to other areas of the warehouse to assists with other fulfillment tasks such as replenishment, picking/sorting at a picking/sorting station and/or packaging.

Figure 11:
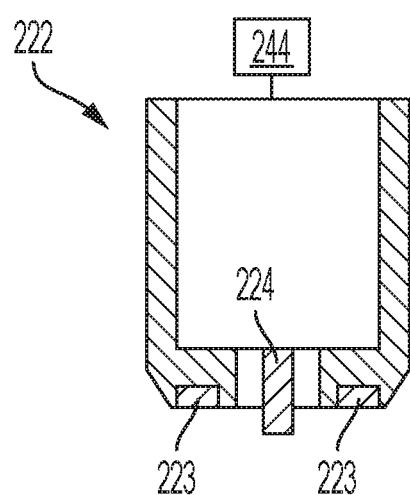
FIG. 11 is a schematic cross-section view of a coupler of the robot of FIG. 9A.

Referring to FIG. 11, robot 200 further includes a pneumatic coupler 222 adapted to receive a fluid, such as compressed air, from supply system 138. Coupler 222 is attached to the vehicle body 202 of robot 200 in a manner that allows the coupler to selectively engage and disengage with valve 150. For example, the coupler may be lowered toward grid 126 to engage valve 150 and raised away from the grid to disengage the valve. Coupler 222 may be a generally hollow tube sized to be positioned within the cavity 143 of rails 122, 124, 125. The mating end of coupler 222 may be tapered and/or include a self-alignment or misalignment handling device to assist in positioning coupler 222 within cavity 143. The mating end of coupler 222 may also include an O-ring (not shown), a magnet 223 for magnetically engaging the magnet 157 or ferrous material disposed around port 146, and a device 224 for transitioning valve 150 between the closed and open conditions. Device 224 may be, for example, a mechanical member adapted to push plug 154 into conduit 144 (away from port 146), or any other device for electrically, magnetically, mechanically or otherwise transitioning valve 150, or another valve, between the closed and open conditions. For example, a similarly constructed coupler may include one or more conductive pads to provide power and actuate an electrohydraulic servo valve.

Robot 200 may optionally carry a small air tank 266 (FIG. 9A) for storing compressed air. In some embodiments, air tank 266 may be smaller than 20 cubic feet. The air tank 266 of robot 200 is in selective communication with coupler 222. In this manner, robot 200 need not access the compressed air of supply system 138 each time the robot desires to grasp a product item. Robot 200 may instead rely on the compressed air stored within air tank 266 to pick inventory items for a limited time, and need only couple to supply system 138 when the robot desires to refill the air tank. As a result, robot 200 can temporarily operate picking arm 206 on the grid without coupling to supply system 138 and/or when the robot is driven off of the grid to assist with other grasping and sorting tasks.

Figure 12A:
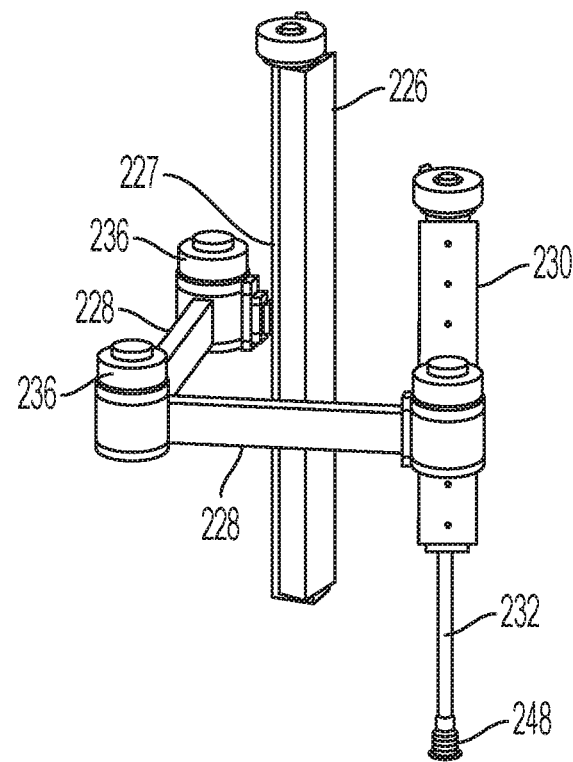
FIG. 12A is a perspective view of the picking arm of the robot of FIG. 9A.
Figure 12B:
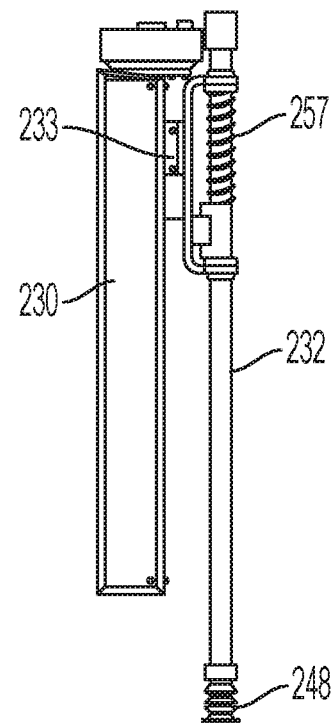
FIG. 12B is a side view of a portion of the picking arm of FIG. 12A.

FIGS. 12A and 12B illustrate an example embodiment of picking arm 206 coupled to pneumatic gripping tool 248. Picking arm 206 is moveable with several degrees of freedom to position pneumatic gripping tool 248 relative to inventory stored in any position within a container 110 and has long stroke (in the Z-direction) to allow robot 200 to lift any sized item from the container, and to deposit the item in order bin 214. In the illustrative embodiment, picking arm 206 may include a base member 226, one or more horizontal extensions 228, a vertical extension 230 and a positioning arm 232 configured to removably secure pneumatic gripping tool 248. Positioning arm 232 may be a relatively thin tube that has a smaller diameter than gripping tool 248. This allows positioning arm 232 to freely position gripping tool 248 within container 110 without interference from other items or partitions disposed within the container. Positioning arm 232 may be coupled to vertical extension 230 via a coupling mechanism 233 that allows the positioning arm to translate along a "first linear pathway," such as a track, extending along the length of the vertical extension. One or more fluid lines are disposed within positioning arm 232 to fluidly couple gripping tool 248 and coupler 222 (FIG. 11). If more than one fluid line is utilized, the fluid lines may be independent from one another.

Base member 226 may be attached to one of the sidewalls 208 and extend above the open top end 212 of vehicle body 202. Base member 226 may include a "second linear pathway" 227, such as a track, extending the length of the base member. Horizontal extensions 228 may be coupled to base member 226 and vertical extension 230 in a manner that allows the horizontal members to move along the second linear pathways 227, to vertically position pneumatic gripping tool 248 relative to the inventory items. Horizontal extensions 228 are also rotationally coupled to the base member, one another, and the vertical extension via joints 236 that allow the pneumatic gripping tool to be positioned relative to the product items with several degrees of freedom. As will be further explained with reference to FIG. 12C, in a preferred embodiment, the combination of the first and second linear pathways is equal to or greater than 2 times the height of containers 110, and preferably equal to or greater than 3 times the height of the containers.

Figure 12C:
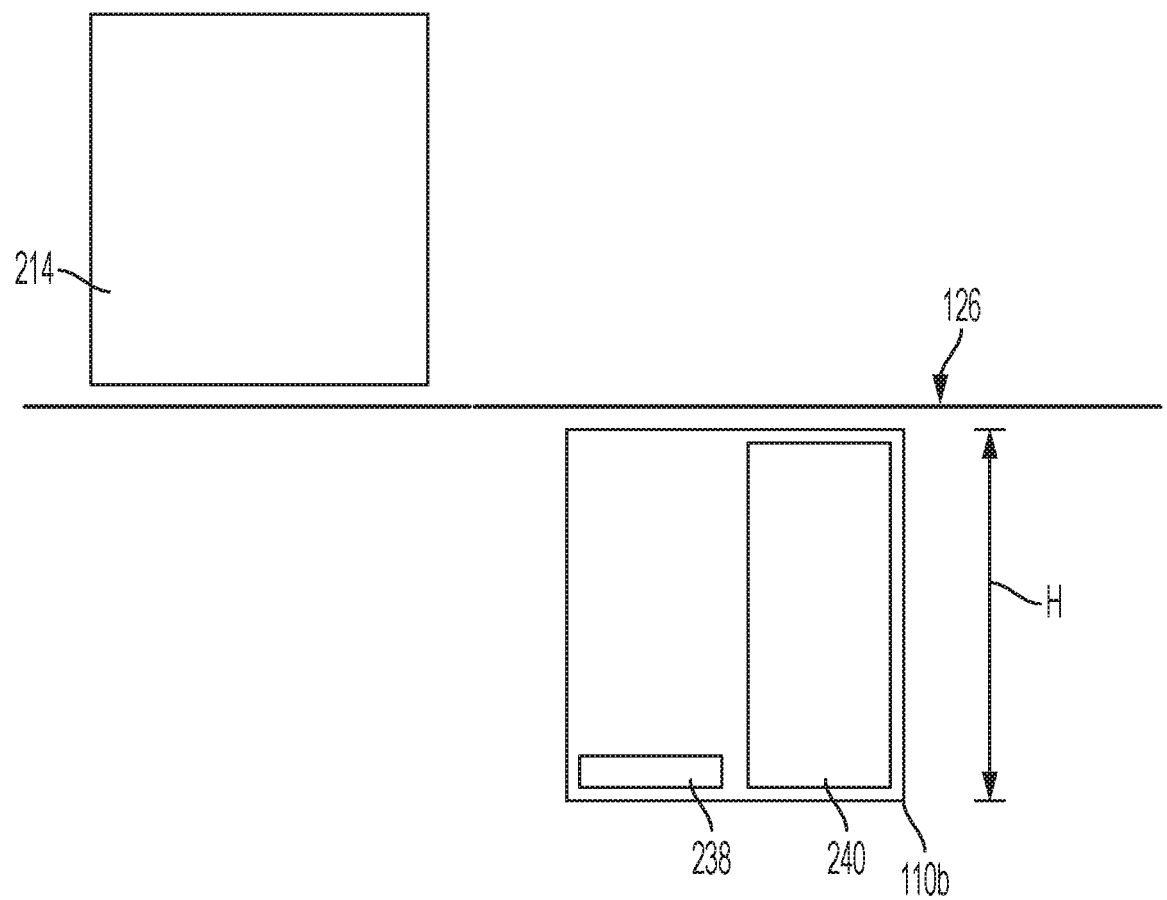
FIG. 12C is a schematic cross-section view of a target container illustrating the picking arm of FIG. 12A picking inventory items of different sizes from the target container.

FIG. 12C is a schematic, cross-section view of target container 110b holding a first, relatively small item 238 (in height) and a second, relatively large item 240 (in height) that is approximately the height of the container. The long stroke picking arm 206 of robot 200 is capable of picking either of the items 238, 240 from target container 110b and depositing the items in order bin 214. For example, in picking item 238 from the bottom of target container 110b, gripping tool 248 must first be lowered a distance equal to the height of the robot body (shown in FIG. 9A) and the height of target container 110b (e.g., a distance equal to approximately 2 times the height of the target container). Thus, in order to pick item 238, horizontal extensions 228 may be moved to the bottom of first linear pathway 227 and positioning arm 232 may be moved downward relative to vertical extension 230, and to the bottom of the second linear pathway, to allow gripping tool 248 to contact and grasp the relatively small item 238. After item 238 has been grasped, positioning arm 232 may be moved upward, and to the top of the first linear pathway, and the horizontal extensions may be moved upwards along the second linear pathway 227, allowing the first item to be deposited within order bin 214.

On the other hand, while picking arm 206 need not be lowered deep into target container 110b to grasp the relatively large second item 240, in order to deposit the second item in order bin 214, the gripping tool must be raised to a sufficient height that allows the bottom of the second item to clear the top of the order bin (e.g., gripping tool 248 must be positioned a distance equal to approximately the height of the container above the top of the order bin). Thus, after the relatively large second item 240 has been grasped by picking arm 206, positioning arm 232 may be retracted upwards relative to vertical member 230 along the first linear pathway and the horizontal members may move toward the top of second linear pathway 227 to allow the bottom of the second item 240 to clear the top of order bin 214. Thus, it will be appreciated that in order to grasp and deposit relatively flat items such as item 238 and relatively tall items such as 240, the stroke of picking arm 206 (in the Z-direction) must be at least 2 times the height of the containers, and preferably 3 times the height. While the stroke length may be accomplished with a single linear pathway, dividing the stroke length into a plurality of linear pathways allows picking arm 206 to be more compact and have a smaller vertical profile.

In a preferred embodiment, as shown in FIG. 12B, picking arm 206 also includes a spring 257 or a compliant gripping element (and/or a back-drivable actuator, or a force controlled actuator that exhibits active compliance and functions as a virtual spring) that provides passive or active compliance. The spring 257 (and/or back-drivable actuator or force controlled actuator) may be provided between pneumatic gripping tool 248 and positioning arm 232, and/or at the coupling mechanism that couples positioning arm 232 and vertical extension 230. Thus, if gripping tool 248 presses against a product or infrastructure of the storage structure with too great a force, the gripping tool or the positioning arm 232 will recoil to prevent damage to the picking arm 206 and/or the product. The compliance may also better position gripping tool 248 relative to the item during grasping.

It will be understood that picking arm 206 may be alternatively constructed and/or include fewer or additional components, so long as the pneumatic gripping tool is positionable with several degrees of freedom to grasp inventory items stored within target container 110b. For example, picking arm 206 may also include a load cell to measure the payload of a grasped item and/or sense an external force applied to the gripping tool. In this manner, robot 200 can instantaneously determine and/or verify the identity of the grasped item.

As mentioned above, gripping tool 248 is in fluid communication with coupler 222 and thus in selective communication with fluid source S. In embodiments in which fluid source S is a pneumatic compressor providing compressed air, robot 200 may include one or more air ejectors, air aspirators, Venturi pumps 244 (FIG. 11) or similar devices capable of using the compressed air of supply system 138 to produce a vacuum or suction force (hereinafter "Venturi pump"). A "bypass valve" may be provided between coupler 222 and Venturi pump 244. The bypass valve is transitionable between 3 conditions: a closed condition, a first open condition and a second open condition. In the closed condition, the bypass valve prevents the compressed air from passing to gripping tool 248. In the first open condition, the bypass valve allows compressed air to flow from coupler 222, through Venturi pump 244 and to gripping tool 248. Thus, when the bypass valve is in the first open condition, the valve allows compressed air to flow through Venturi pump 244 such that the Venturi pump can generate a suction force to operate a gripping tool 248 that relies on suction for grasping. In the second open condition, the bypass valve allows compressed air to flow from coupler 222 to gripping tool 248 but diverts the compressed air around Venturi pump 244. Thus, when the bypass valve is in the second open condition, the compressed air bypasses the Venturi pump and allows robot 200 to utilize the compressed air to actuate a pneumatic gripping tool 248 such as clamp and/or the additional tool elements discussed below. The compressed air may also be utilized to blow or dispel air from gripping tool 248 to reposition inventory items within containers 110 and/or to reposition inventory items within order bins 214 to facilitate packing. Additional valves ("variable valves") may be provided upstream of the bypass valve (e.g., between coupler 222 and the "bypass valve") to precisely regulate airflow to the bypass valve and, in turn, to gripping tool 248.

Figure 13:
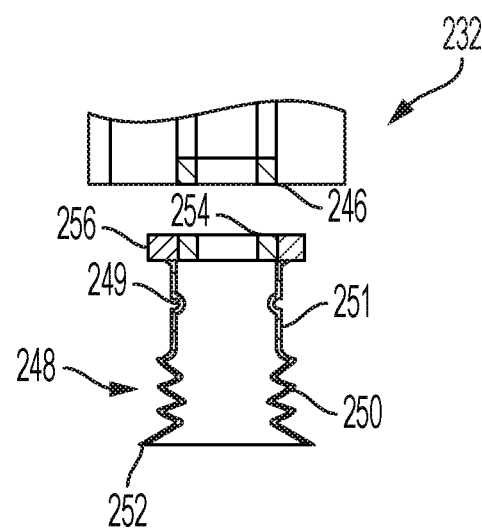
FIG. 13 is a cross-section view illustrating the coupling between the pneumatic gripping tool of FIG. 9A and the picking arm of FIG. 12A.

Referring to FIG. 13, positioning arm 232 includes a magnet 246, for example, a ring magnet 246 or a magnet arrangement that magnetically couples gripping tool 248 to the positioning arm. Gripping tool 248 may be any pneumatically actuated tool for grasping items. For example, pneumatic gripping tool 248 may be a suction cup having a sidewall 251 formed of a resilient material such as rubber with bellows 250, and a groove 249 positioned above the bellows. The sidewall 251 of gripping tool 248 is thus adapted to compress when the gripping tool engages an object. Gripping tool 248 may further include a lip 252 formed from a resilient material, which also may be a rubber, such that the lip of the gripping tool is adapted to deform to and create a seal with the surface of a product in which it engages. A ring magnet 254 may be provided on gripping tool 248 to attract the magnet 246 of positioning arm 232 and to magnetically couple the gripping tool to the positioning arm. A gasket, such as an O-ring 256, may be provided on gripping tool 248 to seal the connection between positioning arm 232 and the gripping tool. In some embodiments, gripping tool 248 may additionally have a groove (not shown) to cooperate with a protrusion (not shown) on the positioning arm 232 to prevent rotational and axial movement of the gripping tool relative to the positioning arm when the gripping tool is coupled to the positioning arm. In other embodiments, gripping tool 248 may be coupled to positioning arm 232 via any other non-magnetic quick-change mechanism such as a push/pull connection or a twist-locked connection.

Gripping tool 248 may additionally include one or more tool elements to assist in gripping or other order fulfillment processes. For example, gripping tool 248 may include a clamp (not shown) having a plurality of pneumatically actuated fingers for grasping the target product. The fingers may be used in combination with the suction cup or in isolation of the suction cup. In some embodiments, the fingers themselves may include suction cups. In other embodiments, gripping tool 248 may include an array of suction cups on a single gripping tool. A single gripping tool 248 may, for example, include a plurality of suction cups arranged in an array to grip large and heavy inventory item at several discrete locations, thereby providing a more stable grasp than a single suction cup, or to grasp multiple items at once. In further embodiments, the additional tool elements may include other gripping elements such as universal jamming grippers, foam vacuum grippers, pneumatically inflatable fingers, pressure actuated fingers, pneumatically actuated linkage or piston driven grippers with rigid or compliant fingers or any other pneumatically driven or vacuum driven (positive or negative pressure) gripper elements. Gripping tool 248 can also include conductive target pads and push-pins on the gripping side of the gripping tool (or vice-versa) to provide power and communication signals to internal sensors and/or actuators of the gripping tool or to electrically supplement the pneumatic grasp. In other embodiments, the tool element(s) may be formed as any pneumatically actuated tool and need not include a "gripping" element for grasping items. The tool element may be, for example, a knife for cutting open boxes. The additional tool elements may be provided on gripping tool 248 or as a separate tool. In embodiments in which a plurality of gripping elements are utilized on a single gripping tool 248, or the gripping tool includes an additional tool elements, each gripping element or tool element may be coupled to an independent and discrete fluid line such that each gripping element or tool element may be independently actuated. Each fluid line may have a Venturi pump 244, bypass valve and one or more variable valves associated with the fluid line to control the suction force or the force of compressed air as explained above.

The combination of pneumatic gripping tools 248 and any one or more of the additional tool elements may be used to grasp one or more objects at a time, manipulate objects within order bins 214, pack grasped objects, swap battery packs on the robot, activate bomb bay doors on a bin, lift and attach an order bin to a container, cut or seal boxes, manipulate items within an order bin, for example, by nudging, blowing or toppling the items, or perform any other operations that facilitate order fulfillment.

Figure 9F:
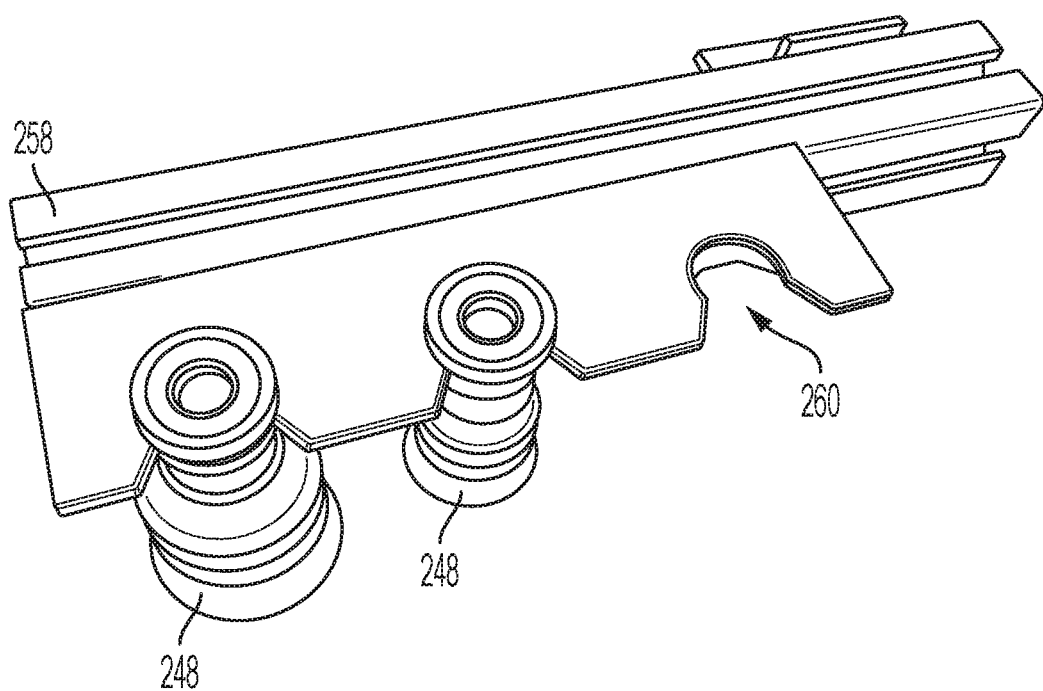
FIG. 9F is a perspective view of a plurality of pneumatic gripping tools being stored in the tool holder of FIG. 9A.

Referring to FIGS. 9A and 9F, the vehicle body 202 of robot 200 may include a tool holder 258 for holding a plurality of gripping tools 248. Tool holder 258 may include a plurality of retainers 260a, 260b (collectively "retainers 260") such as arcuate or rectangular cutouts for receiving the groove 249 of gripping tool 248, or a holding area such as a cup for receiving the sidewall 251 of the gripping tool. In this manner, a plurality of different gripping tools 248 (e.g., gripping tools having different tool elements and/or number of or configurations of tool elements, or suction cups having lips of different sizes, materials, shapes, configurations or orientations) may be interchangeably coupled to positioning arm 232, and to tool holder 258 when not in use, such that the picking arm 206 can select a particular gripping tool based upon the size, shape, material or weight of the product in which the robot is tasked with grasping. In some embodiments, tool holder 258 may be magnetic to assist in securing gripping tools 248. Tool holder 258 may alternatively, or additionally, include a compliant member to secure gripping tools 248 within retainers 260 via a snap-fit connection. Each of gripping tools 248 may include an RFID, AR tag, calibrated weight or similar identifier capable of being identified by a sensor, such as sensors, 262 or the load cells of picking arm 206. In this manner, robot 200 can determine if a gripping tool is secured to picking arm 206 and can verify that the secured gripping tool is the desired gripping tool.

Referring back to FIG. 9B, one or more sensors 264, such as a scanner, may be positioned on the vehicle body 202 or the picking arm 206 of robot 200 to scan picked products and determine and/or verify which order bin 214 the picked product should be deposited. The scanning field of the scanners may be multiplied by positioning mirrors on the inner surfaces of sidewalls 208. Sensors 264 or another sensor may be used to capture an image or data of a grasped product after it has been picked (and before it has been deposited in order bins 214) to identify and/or determine the size and dimensions of the item. This information can be transmitted to central computer 103 which can then instruct manipulator robot 200 to deposit the grasped item within a particular location of one of order bins 214 and/or in a particular orientation to facilitate dense packing. In some embodiments, vehicle body 202 may also include a ledge upon which a grasped item may be temporarily placed, and subsequently re-grasped from a different orientation, in order to adjust the grasp to facilitate packing.

Use of robotic system 100 to piece pick individual product items from containers 110 will now be described. To begin, robot 200 may use its picking arm 206 to grasp one or more order bins 214 and attach the bins to its own vehicle body 202 or the vehicle body of another robot. Alternatively, order bins 214 may be attached to robot 200 by the digging plate or another device on the robot, or external to the robot, or with the assistance of an operator. Robot 200 may then be autonomously positioned on grid 126 and operated under the control of a central computer 103, which continuously logs the location of each of the robots, containers 110 and products contained within the containers. Central computer 103 is additionally designed to efficiently control the movement of robots 200.

When one or more orders are received, the computer assigns the orders to one or more of the manipulator robots 200 based upon the current order volumes of each of the robots and the locations of the products contained in the order. If the product is located beneath a non-target bin, robot 200, or a separate digging robot 205 located nearby, may pull target bin 110b to the top of stack 112. For example, digging robot 205 may position itself over a stack 112 containing the target bin 110b. Digging robot 205 may then extend digger 207 underneath the digging robot and between vertical members 116 and stack 112 (on a single or both lateral sides of the stack) to grasp the target bin 110b and each of the non-target bins 110a positioned between the target bin and grid 126. Each of the grasped bins may then be lifted such that the non-target bins are lifted, for example, through the receiving cavity of the digging robot and the target bin is positioned within the receiving cavity. Digging robot 205 may then drive to a location over a separate stack 112 that is missing a single container, and release target bin 110b on the top of that stack such that robot 200 can pick items from the target bin. In releasing target bin 110b, digging robot 205 may release only the target bin (e.g., never release non-target bins 110a) or release the target bin and the non-target bins to stack the non-target bins on top of the target container such that the bottom most non-target bin is positioned within the receiving cavity of the digging robot and the other non-target containers are stacked above the receiving container of the digging robot, before and again securing all of the non-target bins, driving back to the original stack and depositing the non-target bins in the original stack, and in the original order, less the target bin.

With target bin 110b at the top of stack 112, the central computer then autonomously directs the assigned robot 200 to a first position on grid 126 located above or adjacent to a first one of the products contained in the order. Mobility assembly 204 allows robot 200 to navigate rails 122, 124, 125 and move to the desired position on grid 126. Robot 200 may then transition valve 150 to its open condition to receive pneumatic air to pick from target bin 110b.

Figure 14A:
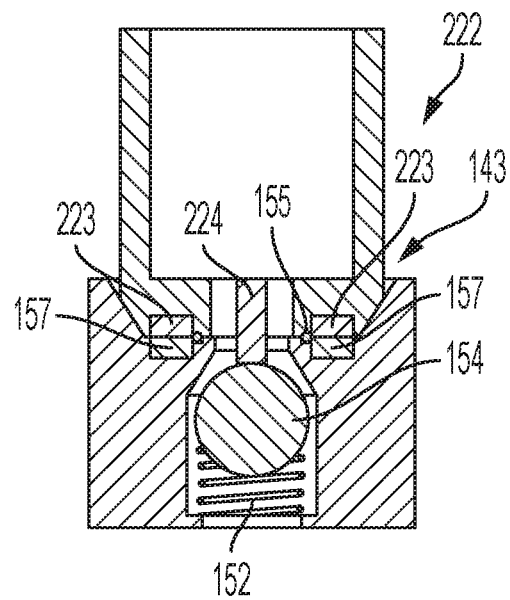
FIGS. 14A and 14B are schematic cross-sections illustrating the coupling between the coupler of FIG. 11 and the conduit of FIGS. 7A and 7B.
Figure 14B:
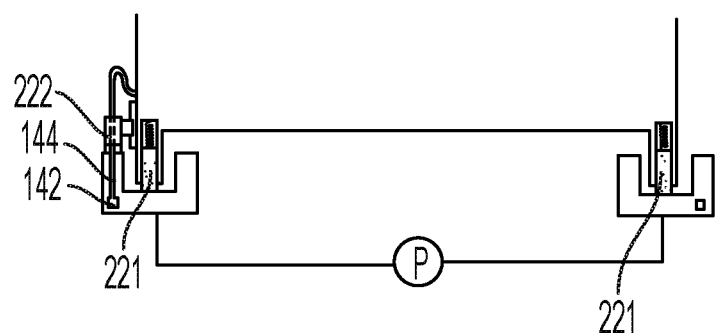

More specifically, as is shown in FIG. 14A, robot 200 may be coupled to grid 126 by positioning coupler 222 within cavity 143 such that the magnet 223 of the coupler engages the magnet 157 surrounding port 146. Insertion of coupler 222 into cavity 143 may be aided by the tapered edges of the coupler and the tapered edges of the cavity. In this manner, if coupler 222 is slightly misaligned with respect to port 146, the tapered edge of the coupler will slide down the tapered edge of the cavity to guide the coupler into proper alignment with the port.

Alignment may also be aided by the magnetic connection between the magnet 223 of coupler 222 and the magnet 157 or ferrous material surrounding port 146. The magnetic connection also aids in securing coupler 222 within cavity 143 against the upwardly directed force of compressed air that is created as device 224 compresses plug 154 into conduit 144 (away from the upper surface 128 of rails 122, 124, 125) while valve 150 is transitioned to the open configuration, thereby allowing pneumatic air to flow around the plug and into the coupler. In the event that the valve is an electrohydraulic servo valve, the coupler may be similarly engaged with the valve such that the conductive target pads provide power to electrically transition the valve from the closed condition to the open condition. The electrohydraulic valve may alternatively be transitioned by a voltage received from grid 126 upon receiving a signal from robot 200 or central computer 103.

With fluid supply system 138 coupled to robot 200, the robot may immediately use the compressed air for grasping and/or store the compressed air within air tank 266 for later use. In embodiments in which pneumatic gripping tool 248 relies on a suction force to grasp objects, the one or more Venturi pumps 244 can use the compressed air provided by pneumatic air source S to generate a suction force for operating gripping tool 248.

Upon arrival at a desired grid space 127, the picking arm 206 and pneumatic gripping tool 248 may immediately be positioned in the grasping pose as instructed by the central computer 103, as explained above with reference to FIG. 9C, or as instructed by a teleoperator.

Figure 15:
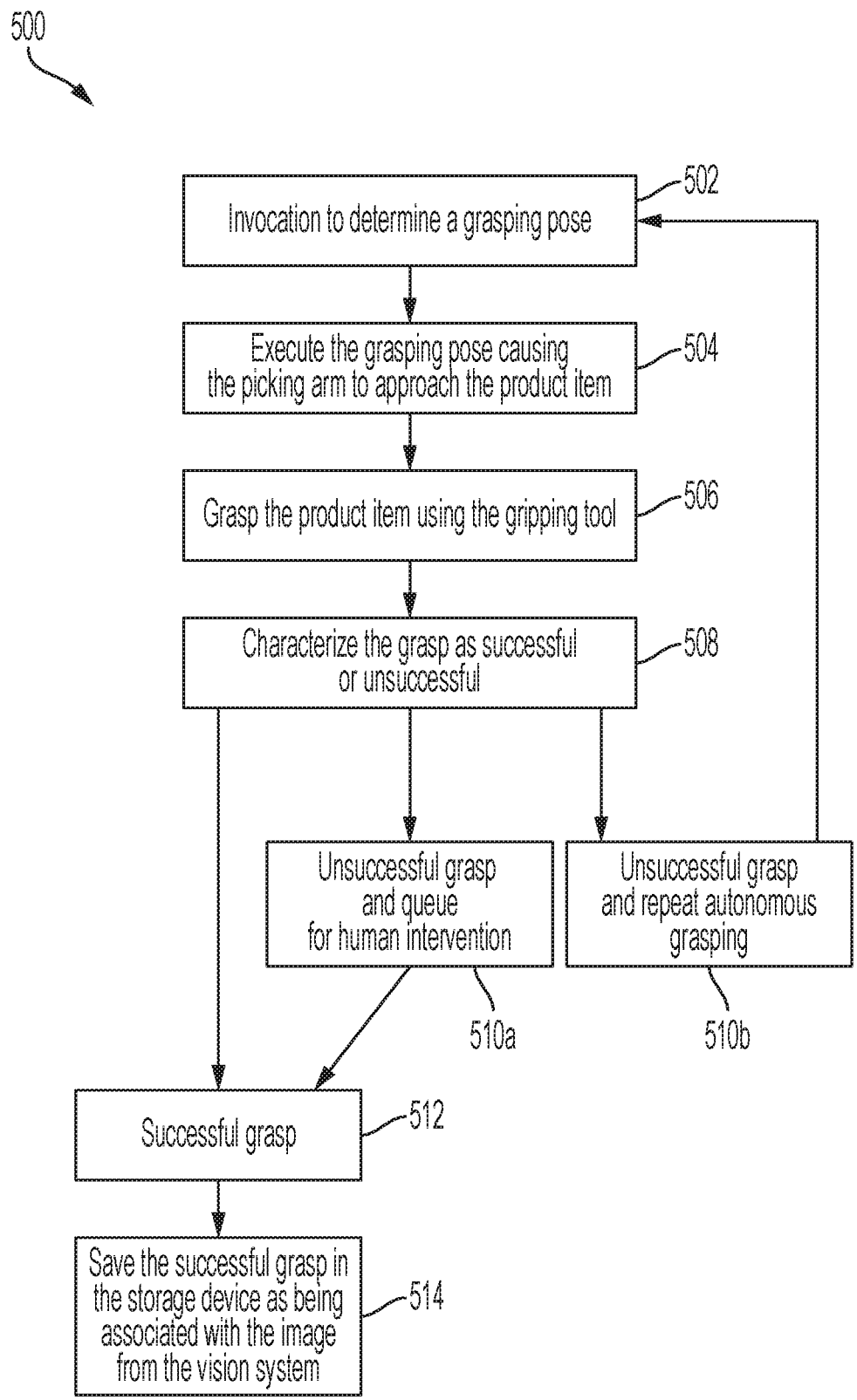
FIG. 15 is a flow chart showing a method of grasping a product item using the picking arm and the pneumatic gripping tool of FIG. 13.

The method of grasping a product item 500 will now be explained with further reference to FIG. 15. If robot 200 has not predetermined the grasping pose before manipulator robot 200 is in the picking position, the method will begin, at 502, with a command from processor 103 that instructs sensors 262 to capture an image of the inventory disposed within a target container 110b. After manipulator robot 200 receives the selected grasping pose signal, the robot executes the signal, at 504, causing picking arm 206 to perform the selected gasping pose. That is, gripping tool 248 approaches the product item, as instructed by processor 103, and contacts grasping region 414 of the product item. After the grasping attempt, one of the sensors 262 characterizes the grasp, at 508, as either successful or unsuccessful. That is, if the picking arm 206 of robot 200 is able to successfully grasp and remove the product item from target container 110b, sensor 262 will characterize the grasp as successful and transmit a successful grasp signal to processor 103 via communication channels 104. On the other hand, if the picking arm 206 of robot 200 is unable to remove the item from the container, or the picking arm drops the item before the processor 103 instructs robot 200 to release the item, the sensor will characterize the grasp as unsuccessful and transmit an unsuccessful grasp signal to the processor via communication channels 104. Upon characterizing the grasp as unsuccessful, processor 103 can either: (1) immediately signal to teleoperator interface 102, at 510a, and request intervention; or (2) attempt to determine a new grasping pose, at 510b, to autonomously pick up the product item based upon a new or modified grasping pose. If processor 103 elects to autonomously determine a new grasping pose, the steps described above, with respect to FIG. 9C, may be repeated until either the grasp is characterized as successful, at 512, or until intervention is requested at 510a.

If processor 103 signals for intervention, the signal may be sent directly or indirectly to the teleoperator interface 102. In situations in which teleoperator interface 102 is communicatively coupled to a plurality of manipulator robots 200, each of the robots may be indirectly coupled to teleoperator interface 102 via a 'broker'. The broker may be part of processor 103, or a separate processor, tasked with ordering the help requests from each robot within a queue of the teleoperator interface. The broker may run an algorithm to determine a 'needs help score' to determine the priority of the queue. The algorithm may be based on several factors including number of prior grasp failures, level of grasping difficulty, and the like.

Once the help request signal has been received by teleoperator interface 102, an operator can remotely pilot the picking arm 206 of robot 200 and direct the picking arm to execute a specified grasping pose to grasp the product item. Specifically, the operator can view the items on the output device (e.g., the display) of teleoperator interface 102 and directly control the picking arm 206 of robot 200 to grasp the grasping region 414 of the item by manipulating the input device of the operator interface. In some instances, the operator may also prompt picking arm 206 to grasp a product item in combination with an automated motion sequence calculated by a motion planner. In this manner, the operator may simply select a pixel on the image feed representative of the grasping region 414 while processor 103 autonomously determines and instructs robot 200 to execute a selected grasping pose as described above with reference to FIG. 9C.

Sensors 262 can then optionally characterize the grasp as either successful or unsuccessful as described above at 508. The operator can additionally, or alternatively, make the same characterization. If sensor 262 (or the operator) characterizes the grasp as successful, the grasping pose used to grasp the product item may be saved within storage device 105, at 514, for future use. Robot 200 can thus learn to infer or predict new grasping poses to improve automation of the grasping process.

There is not a single gripping tool that can optimally handle a large variety of inventory. For this reason, robot 200 may autonomously decide, or be instructed from the teleoperator, to switch gripping tools. Gripping tool 248 may be selected based upon the type of task or the product type (which may be determined by the central computer through inventory tacking of the product types in each bin), analysis of the image data and/or as a result of historical data relating to successful picks of that product or similar constructed products. More specifically, the central computer 103, or an operator, may instruct manipulator robot 200 to couple a particular gripping tool 248 to picking arm 206 that can engage the grasping region 414 of the item with minimal leakage between the gripping tool and the surface of the item.

With reference to FIGS. 9F and 13, if robot 200 or the teleoperator determines that it is desirable to switch gripping tools 248, the robot will move picking arm 206 to position the groove 249 and/or the sidewall 251 of the gripping tool attached to the picking arm within one of the retainers 260 of tool holder 258. Subsequently, the picking arm 206 may be retracted or moved upward to decouple the magnet 246 of the picking arm from the magnet 254 of gripping tool 248. The picking arm 206 may then be positioned over another one of the gripping tools, positioned within tool holder 258, to magnetically couple the picking arm to the other one of the gripping tools before moving the picking arm laterally to slide the coupled gripping tool out of its respective retainers 260. It will be appreciated, however, that other mechanisms for swapping gripping tools may also be utilized.

As gripping tool 248 is brought into contact with the product item, the lip 252 of the gripping tool deforms and conforms to the surface of the product as a suction force is applied to grasp the product. Additionally, the compliance in gripping tool 248 and/or picking arm 206 will compensate for inaccuracies of the sensing system or grasping algorithm to position the gripping tool in a better grasping pose upon contact with the product. With the product grasped, picking arm 206 may then lift the target product from container 110 and optionally position or wave/rotate the product in front of scanners 264 to scan an identifier such as a barcode or RFID located on the target product for the purpose of confirming that the correct product has been grasped and/or to inform the picking arm as to which order bin 214 the product should be released. During this time, sensors 262 may additionally collect data relating to the size and dimension of the product and transmit this information through communication channels 104 to central computer 103.

In some instances, central computer 103 may then autonomously instruct, or the teleoperator may manually instruct, picking arm 206 to release or place the grasped item in a particular location and/or orientation within order bin 214. Gripping tool 248 and/or tool elements of the gripping tool may then further be used to push, blow on, or otherwise manipulate the product to a particular location or orientation within bin 214. In this manner, subsequently picked items may be efficiently packed within order bin 214 such that smaller order bins may be utilized. This increases the overall amount of order bins that may be transported by a single robot, and in turn, increases the throughput of the system. After robot 200 has sequentially picked up each of the products corresponding to a particular order, order bins 214 may be transported out of storage structure 114, for example, via shafts 121 and the associated conveyor belts, for additional processing, sorting, packaging and/or shipping. If robot 200 is tasked with picking multiple consumers orders at once, robot 200 need not pick all of the products pertaining to the first consumers order before beginning to pick the second consumer's orders. In fact, the central computer will direct robot 200 to pick items based upon the storage locations of the products and irrespective of the consumer who ordered the product.

Figure 16:
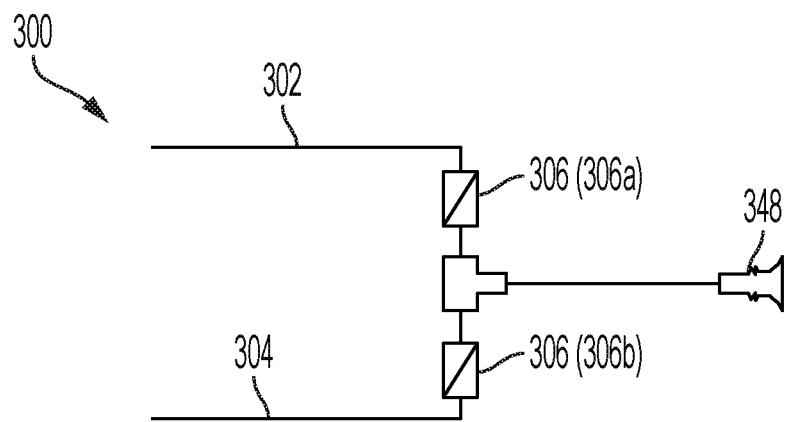
FIG. 16 is schematic illustration of an alternative pneumatic system for use with the manipulator robot of FIG. 9A.
Figure 17:
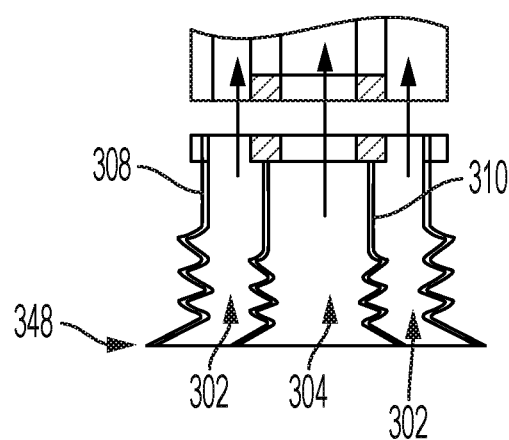
FIG. 17 is a cross-section view of a modified gripping tool for use with the alternative pneumatic system of FIG. 16.

In a variant aspect, a manipulator robot is similar to robot 200 but for the particulars of its pneumatic system as discussed below. The pneumatic system 300 of the variant robot is schematically illustrated in FIG. 16. In this variant, the robot does not rely on pneumatic air from the storage structure, instead the robot may have a modified pneumatic system coupled to the vehicle body of the robot. The pneumatic system may include a single or two-tiered vacuum having a first vacuum 302 and a second vacuum 304 in selective communication with a gripping tool such as a single suction cup or a modified gripping tool 348 (FIG. 17). First vacuum 302 may be a vacuum with high flow rate (capable of displacing large volumes of air per minute) while second vacuum 304 may be strong vacuum generator capable of producing a larger pressure differential with atmospheric pressure (which increases the payload or force that can be held by the suction cup). Pneumatic system 300 further includes two valves 306a, 306b (collectively "valves 306"), for example, servo-valves that may be toggled between an open condition and a closed condition for controlling communication between the first and second vacuums and gripping tool 248 or modified gripping tool 348.

As shown in FIG. 17, modified gripping tool 348 includes a first suction cup 308 and a second suction cup 310, which may be concentrically positioned within the first suction cup. The first suction cup 308 and the second suction cup 310 are otherwise formed generally as previously described with respect to the suction cup of gripping tool 248, and therefore, are not again described in detail. The only difference being that that modified gripping tool 348 is a dual suction cup as opposed to the single suction cup of gripping tool 248. First vacuum 302, or the high flow rate vacuum, may be in selective communication with first suction cup 308, while second vacuum, or the high pressure vacuum, may be in selective communication with the second suction cup 310.

Use of the pneumatic system 300 will now be described only with reference to the grasping task as the variant robot is otherwise operated as previously described above with respect to robot 200. Before grasping a product, valve 306a may be transitioned to its open position, providing the first suction cup 308 with a high flow rate vacuum suction force as the lip of the first suction cup deforms to correspondingly match the surface of the target product. After an initial seal has been initiated, the high pressure vacuum line of vacuum 304 is enabled by transitioning valve 306b to the open condition. The high pressure suction force enables the picking arm to support larger payloads than would otherwise be possible with the high flow rate vacuum alone. In this manner, a firmer grasp may be provided. Of course, valves 306a and 306b could both be set to their open positions during initial grasping of the target product and until the robot desires to release the target product. Alternatively, valves 306a and 306b could be toggled back and forth and between open, closed and partially closed conditions in order to achieve a desired grasp of the target product.

By utilizing two relatively small vacuum sources, a high flow rate vacuum and a high pressure vacuum, to respectively create an initial seal and to firmly grasp products, the physical size of the vacuums may be reduced such that the vehicle body of the robot need not be as dramatically modified. In this manner, the variant robot may be used to piece pick products stored within storage structure 114 or within frame structure 14 discussed with respect to the prior art.

Figure 18:
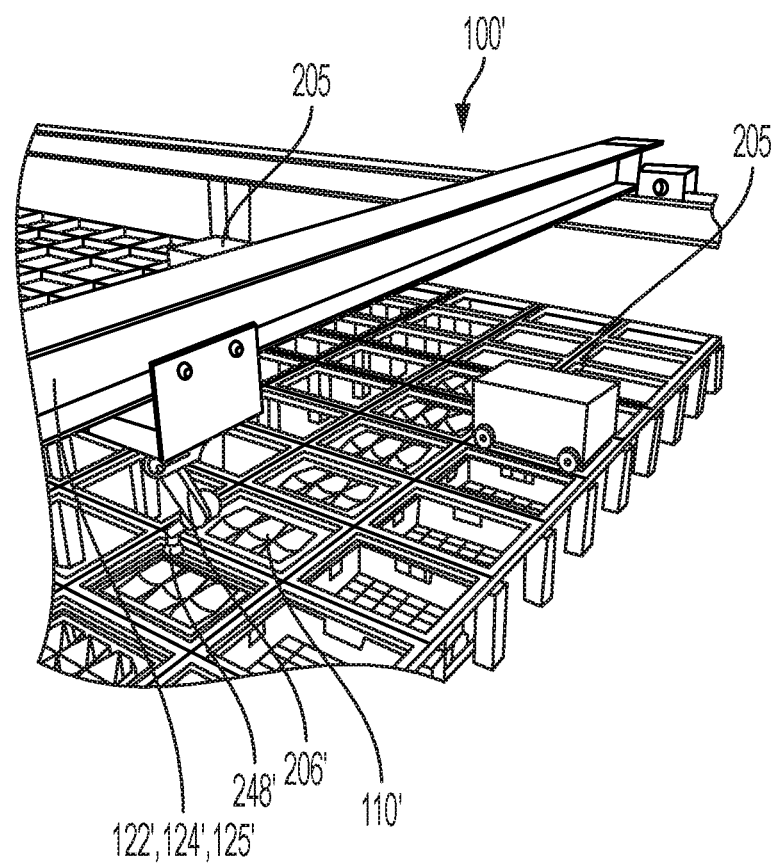
FIG. 18 is a partial perspective view of a modified storage structure including a gantry frame supporting a robotic picking arm equipped with a pneumatic gripping tool.

FIG. 18 is a perspective view of a modified robotic system 100' configured to efficiently store a plurality of stacked containers 110'. Modified robotic system 100' includes all of the above described features of system 100 and the additional features described hereinafter. Rails 122', 124', 125' may additionally extend above the grid (supporting a manipulator robot 200 and digging robot 205) and alone, or in combination with additional support members, form a gantry frame that supports one or more robotic picking arms 206' equipped with a pneumatic gripping tools 248' in a manner that permits the picking arm to move about the gantry frame and piece pick inventory from containers 110'. In this manner, compressed air may flow through rails 122', 124', 125', and/or the additional rails, to the pneumatic gripping tool 248' of picking arm 206' for grasping products from containers 110'. Rails 122', 124', 125', or the additional support members, positioned above the grid may also include one or more valves similar to valve 150, such that the valves are accessible to manipulator robot 200 (positioned on the grid) and allow the manipulator robot to selectively couple to the pneumatic supply system.

Alternatively, robotic picking arms 206' may be fixed on a frame above the grid and digging robot 205 or another bin carrying robot may transport a target container 110' to the picking arm, which may grasp the desired item(s) and place the grasped items into an order bin carried by a transporter robot. In this manner, containers 110' need not be transported down the ports and back-and-forth from the picking/sorting stations.

Figure 19:
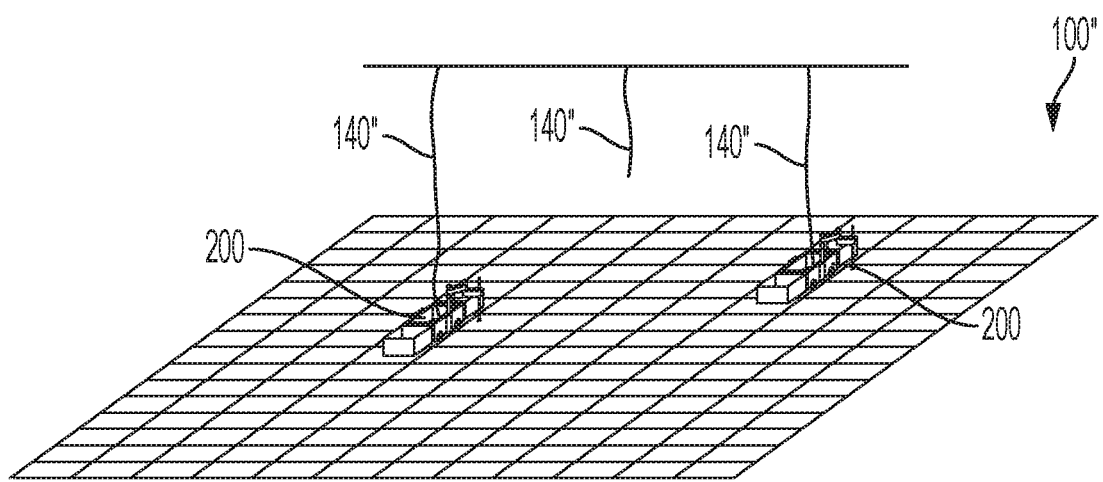
FIG. 19 is a schematic illustration of another modified storage structure including an assembly positioned above the rails and fluid supply line extending from the assembly toward the rails.

FIG. 19 is a perspective view of yet another alternative robotic system 100" configured to efficiently store a plurality of stacked containers. Robotic system 100" includes all of the above described features of robotic system 100 and the additional features described hereinafter. Manipulator robot 200, or another manipulator robot, may be positioned at a station on grid 126 (e.g., so as to not move) or configured to move within a specific area of the grid. These robots may be permanently or selectively coupled to supply lines 140" that hang from a structure above the grid, such as the ceiling of warehouse 101, or otherwise extend toward the surface of grid 126. In some embodiments, supply lines 140" may be retracted, for example, via a drag chain cable carrier, cable retractor or similar device to manage cable slack in the supply lines. Supply lines 140" may additionally include a power cord, or other mechanism, to supply a voltage to robot 200 when the robot is coupled to the supply lines. A digging robot such as digging robot 205 can transport a container 110 to manipulator robot 200, stationed within a particular area of the grid 200, before inventory is picked from the container and deposited to a plurality of other containers as described above with respect robot system 100.

Figure 20:
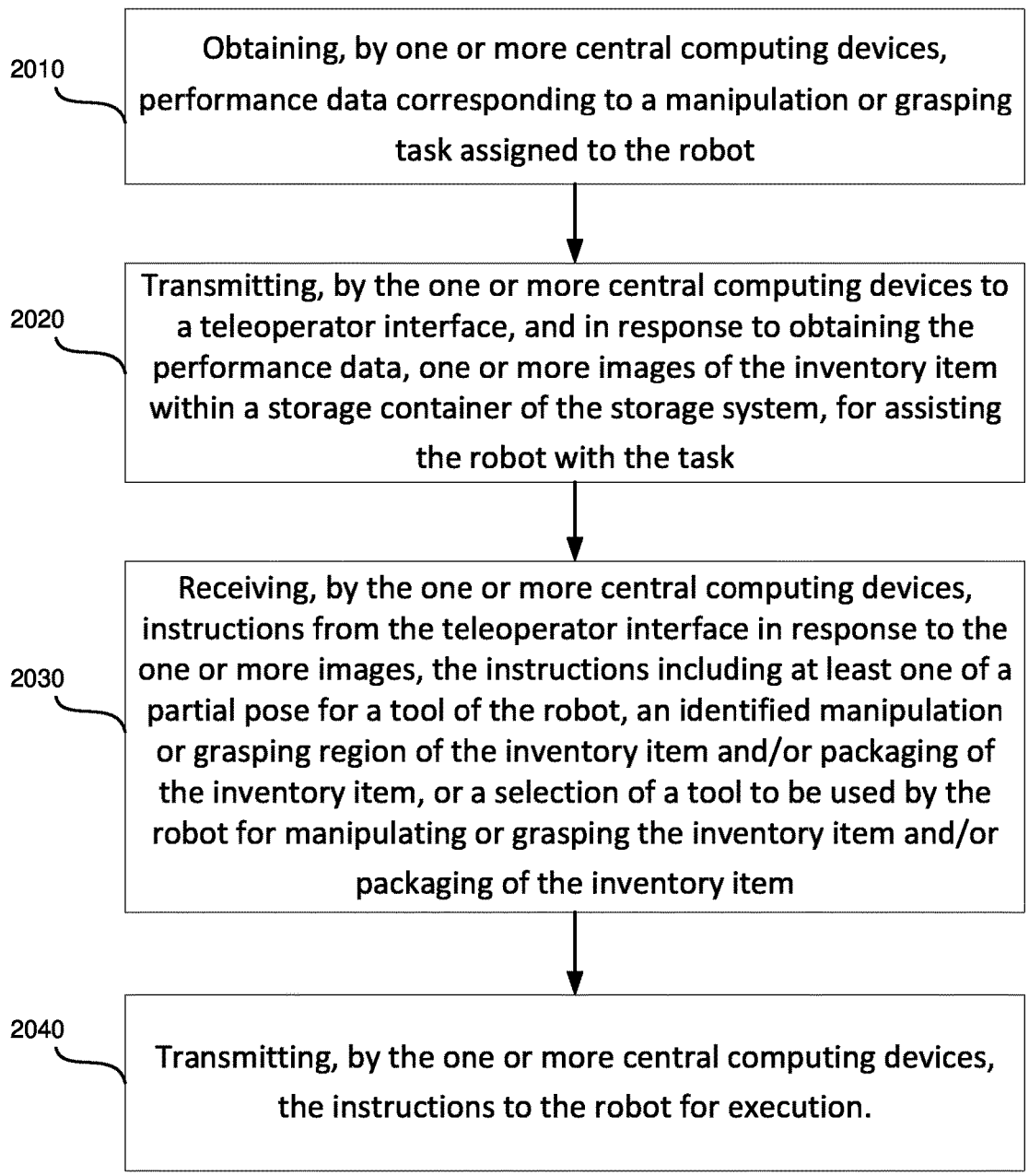
FIG. 20 is a flow chart showing an example method of a method for assisting or controlling the operation of a mobile manipulator robot movable along rails of a storage system.

FIG. 20 is a flow chart showing a method 2000 for assisting or controlling the operation of a mobile manipulator robot movable along rails of a storage system. As illustrated in block 2010, one or more central computing devices may obtain performance data corresponding to a manipulation or grasping task assigned to the robot. The one or more central computing devices may transmit, to the teleoperator interface, in response to obtaining the performance data, one or more images of the inventory item within a storage container of the storage system, for assisting the robot with the task, as shown in block 2020. The one or more central computing devices may receive instructions from the teleoperator interface in response to the one or more images, as illustrated in block 2030. The instructions may include at least one of a partial pose for a tool of the robot, an identified manipulation or grasping region of the inventory item and/or packaging of the inventory item, or a selection of a tool to be used by the robot for manipulating or grasping the inventory item and/or packaging of the inventory item. As illustrated in block 2040, the one or more central computing devices may transmit the instructions to the robot for execution.

To summarize the foregoing, a storage system for robotic picking, may include support members, a first set of parallel rails to support a mobile, manipulator robot and a fluid supply line having a plurality of valves disposed within the fluid supply line, and each of the valves may have a closed condition in which the fluid supply line is in isolation from an outside environment and an open condition in which the fluid supply line is in communication with the outside environment such that the fluid supply line is configured to supply fluid to a mobile, manipulator robot; and/or the storage structure may further include a second set of parallel rails extending substantially perpendicular to the first set of parallel rails such that the first and second set of parallel rails form a grid having a plurality of grid spaces; and/or when the grid is a first grid and the plurality of grid spaces is a first plurality of grid spaces, the storage system may have a third set of parallel rails and a fourth set of parallel rails extending substantially perpendicular to the third set of parallel rails, such that the third and fourth set of parallel rails form a second grid elevated above the first grid, whereby the second grid has a plurality of second grid spaces, and the storage structure may further include an inclined ramp including a fifth set of rails connecting the first grid and the second grid; and/or the storage structure may further include a fluid source in fluid communication with the fluid supply line, and the fluid source may be a pneumatic source; and/or the fluid supply line may be attached to an external surface of the first set of parallel rails; and/or the fluid supply line may be a channel embedded within and extending in a longitudinal direction of the first set of parallel rails, and a plurality of conduits may extend between the channel and a respective port located adjacent a surface of the first set of parallel rails; and/or at least one of the plurality of valves may be disposed within a respective one of the conduits; and/or at least one of the plurality of valves may include a biasing member coupled to a plug, and when the valve is in the closed condition, the biasing member may biases the plug into the port; and/or the storage system may further include a mobile, manipulator robot for picking inventory items stored within the storage structure, and the robot may include a mobility assembly coupled to the body and configured to guide movement of the robot along the first set of parallel rails, a pneumatic coupler sized and configured to mate with at least one of the plurality of valves and receive fluid from the supply line, and a picking arm equipped with a pneumatic gripping tool to pick inventory items; and/or the first set of parallel rails may include a conductive metal configured to receive a voltage from a charged or grounded source; and/or a portion of a surface of the conductive metal may be anodized or otherwise coated to prevent transfer of the voltage through the coated surface.

In another aspect, a mobile, manipulator robot is provided for retrieving inventory from a storage structure, and may include a body having an interface configured to send processor readable data to a central processor and receive processor executable instructions from the central processor, a mobility assembly coupled to the body, a coupler selectively mateable to a port to receive a fluid supply from a supply line and a picking arm connected to the body, such that the picking arm may be coupled to a first pneumatic gripping tool and configured to pick inventory items; and/or the robot may further include a tool holder attached to the body, and the tool holder may have a plurality of retainers; and/or the robot may further include a second pneumatic gripping tool having a different size or material than the first pneumatic gripping tool, and each of the first and second pneumatic gripping tools may be are interchangeably coupleable to the picking arm and disposable within a respective one of the plurality of retainers; and/or the first pneumatic gripping tool may have an additional tool element; and/or the robot may include a Venturi pump provided downstream of the coupler and upstream of the first pneumatic gripping tool; and/or the robot may include a conductive brush to receive voltage from a surface contacting the mobility assembly; and/or the mobility assembly may include a plurality of wheels, a motor and a transmission operably coupling the motor to each of the plurality of wheels, and the motor may be arranged to control an orientation of each of the wheels, whereby the wheels are simultaneously rotatable between a first orientation and a second orientation; and/or the robot may include a sensor to collect product information relating to at least one of a surface geometry, surface texture or porosity from which a grasping region of the inventory items can be determined; and/or the first pneumatic gripping tool may be a suction cup; and/or the robot may include an air tank coupled to the body, and the air tank may be less than 20 cubic feet; and/or the inventory may be stored within a container having a height, and the picking arm may have an end-effector stroke in a vertical direction that is at least two times the height of the container; and/or the picking arm may include a base member coupled to the body, a horizontal extension coupled to the base member, a vertical extension coupled to the horizontal extension, and a positioning arm coupled to the vertical member such that the positioning arm may be translatable relative to the vertical extension, and at least one of a spring, a backdrivable actuator, a force controlled actuator, or a compliant gripping element may be coupled to the positioning arm to provide passive or active compliance.

In yet another embodiment, a method of controlling a mobile, manipulator robot to retrieve a product stored within a container located in a storage structure is disclosed, and the method may include moving the mobile, manipulator robot over a first set of parallel rails of the storage structure and to a picking location, identifying a grasping region located on a product based at least in part upon image data obtained by a sensor attached to the mobile, manipulator robot, adjusting a picking arm equipped with a pneumatic gripping tool to a grasping pose, and grasping the product using the pneumatic gripping tool; and/or the moving step may be autonomous and at least in part controlled by a central computer; and/or the adjusting step may be autonomous and the picking arm may be set to the grasping pose by a computer configured to predict the grasping pose using an algorithm; and/or the method may further include determining the grasping pose during the moving step; and/or the grasping pose or the identification of the grasping region may be at least in part manually determined by a teleoperator; and/or the method may further include engaging a coupler of the mobile, manipulator robot to a port to transfer pneumatic air from a supply line to the mobile, manipulator robot; and/or the method may further include switching the pneumatic gripping tool for a different pneumatic gripping tool; and/or the pneumatic gripping tool and the different pneumatic gripping tool may have different sizes or materials; and/or the method may further include placing the product in an order container carried by the mobile, manipulator robot or a different robot; and/or the product may be placed in the order container in an orientation determined by a computer or a teleoperator predetermined orientation; and/or the method may further include moving a digging robot to a first position located over a first stack including a target container containing the product, extending a digger beneath the body of the digger robot, securing the target container and one or more non-target containers positioned over the target container to the digger, lifting the target container and the one or more non-target container, moving the digging robot to a second position located over a second stack of containers missing a single container, and releasing the target container on top of the second stack.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A method for assisting or controlling operation of a mobile manipulator robot movable along rails of a storage system, the method comprising:
    obtaining, by one or more central computing devices, performance data corresponding to a manipulation or grasping task assigned to the robot;
    transmitting, by the one or more central computing devices to a teleoperator interface, and in response to obtaining the performance data, one or more images of the inventory item within a storage container of the storage system, for assisting the robot with the task;
    receiving, by the one or more central computing devices, instructions from the teleoperator interface in response to the one or more images, the instructions including at least one of a partial pose for a tool of the robot, an identified manipulation or grasping region of the inventory item and/or packaging of the inventory item, or a selection of a tool to be used by the robot for manipulating or grasping the inventory item and/or packaging of the inventory item; and
    transmitting, by the one or more central computing devices, the instructions to the robot for execution.

2. The method of claim 1, wherein when the instructions include the selection of the tool, the selection of the tool being made from a plurality of tools available to the robot.

3. The method of claim 1, wherein the instructions further include placement instructions defining the orientation and/or location the inventory item should be placed at an end destination.

4. The method of claim 1, further comprising:
receiving additional instructions from the teleoperator interface;
enqueuing each of the additional instructions into an execution queue; and
forwarding each of the additional instructions to the robot for execution to manipulate or grasp the inventory item, wherein each of the additional instructions are forwarded based on their respective positions in the execution queue.

5. The method of claim 1, wherein the performance data comprises a request for assistance in manipulating or grasping the inventory item, the request for assistance originating from the robot.

6. The method of claim 1, wherein the performance data comprises a request for assistance in manipulating or grasping the inventory item, the request for assistance being transmitted by the one or more central computing devices, the one or more central computing devices being part of a warehouse management system.

7. The method of claim 1, wherein the instructions include the identified manipulation or grasping region on the inventory item and/or packaging of the inventory item, the identified manipulation or grasping region including a location selected from the one or more images of the inventory item displayed on the teleoperator interface.

8. The method of claim 7, wherein the performance data and the instructions are saved to a local or remote storage device.

9. The method of claim 1, wherein the instructions include the identified manipulation or grasping region on the inventory item and/or packaging of the inventory item, the identified manipulation or grasping region corresponding at least in part to a relatively non-porous and flat surface on the inventory item, or packaging of the inventory item.

10. The method of claim 9, further comprising:
determining, by the one or more central computing devices, based on the identified manipulation or grasping region on the inventory item and/or packaging of the inventory item, a manipulation or grasping pose, the manipulation or grasping pose indicating a position, orientation, and/or posture that the tool should be arranged when attempting to manipulate or grasp the inventory item and/or packaging of the inventory item; and
forwarding, the manipulation or grasping pose to the robot for execution to manipulate or grasp the inventory item within, or in correspondence with, the instructions.

11. The method of claim 1, further comprising:
obtaining, one or more additional performance data corresponding to one or more additional manipulating or grasping tasks; and
transmitting, in response to obtaining the additional performance data, one or more additional images of one or more additional inventory items within one or more additional storage containers of the storage system, wherein, a priority score is assigned to each of the task and the one or more additional tasks.

12. The method of claim 11, wherein the performance data and the one or more additional performance data comprises at least one of: inventory information, a number of grasp failures the respective robot has incurred when attempting to manipulate or grasp the respective inventory item, grasp success rate of and/or a level of difficulty in manipulating or grasping the respective inventory item, and wherein the priority score is assigned based upon the one or more additional performance data and the performance data.

13. The method of claim 12, wherein the one or more central computing devices, transmit the one or more images of the inventory item and the one or more additional images of the one or more additional inventory items to the teleoperator interface with the assigned priority scores.

14. A system for remotely assisting or controlling operation of mobile robots movable along rails of a storage system, comprising:
a teleoperator interface comprising:
a display;
one or more processors; and
memory storing instructions, the instructions, when executed by the one or more processors, cause the one or more processors to:
receive, from a central computing device, one or more images of an inventory item stored within a storage container of the storage system for assisting with a manipulating or grasping task, the one or more images captured by one or more sensors mounted to a robot;
output the one or more images-on the display;
receive, from an operator, instructions for completing the task based on at least one of the one or more images; and
transmit the instructions to the central computing device for execution by the robot.

15. The system of claim 14, wherein the instructions include a location on the inventory item and/or packaging of the inventory item for the manipulating or grasping task, wherein the location corresponds to a selection, by the operator, of a portion of at least one of the one or more images output on the display.

16. The system of claim 14, wherein the instructions include at least one of a partial manipulation or grasping pose for a tool, an identification of a manipulation or grasping region on an inventory item and/or packaging of the inventory item, a selection of a tool of the robot.

17. The system of claim 14, wherein the instructions include the selection of a tool, the selection of the tool being made from a plurality of available tools.

18. The system of claim 14, wherein the instructions include instructions for swapping a first tool for a second tool.

19. The system of claim 14, wherein the instructions further cause the one or more processors to:
receive one or more additional images of inventory items stored within respective storage containers of the storage system for assisting with additional manipulating or grasping tasks; and
enqueuing the one or more images of the inventory item and the one or more additional images of inventory items into a queue.

20. A method for assisting or controlling operation of a mobile manipulator robot movable along rails of a storage system, the method comprising:
obtaining, by one or more central computing devices, performance data corresponding to a manipulation or grasping task assigned to the robot; and
transmitting, by the one or more central computing devices to a teleoperator interface, and in response to obtaining the performance data, one or more images of the inventory item within a storage container of the storage system, for assisting the robot with the task.

* * * * *